United States Patent
Pesce et al.

(10) Patent No.: US 9,120,587 B2
(45) Date of Patent: *Sep. 1, 2015

(54) IN-PACKAGE NON-IONIZING ELECTROMAGNETIC RADIATION STERILIZATION

(71) Applicant: PepsiCo, Inc., Purchase, NY (US)

(72) Inventors: Thaddeus Pesce, White Plains, NY (US); Ralph DiGiacomo, Palisades, NY (US)

(73) Assignee: PepsiCo, Inc., Purchase, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/677,842

(22) Filed: Nov. 15, 2012

(65) Prior Publication Data

US 2013/0071527 A1 Mar. 21, 2013

Related U.S. Application Data

(63) Continuation-in-part of application No. 12/879,611, filed on Sep. 10, 2010.

(60) Provisional application No. 61/561,467, filed on Nov. 18, 2011.

(51) Int. Cl.
*B65B 55/08* (2006.01)
*B65D 81/34* (2006.01)
(Continued)

(52) U.S. Cl.
CPC ................ *B65B 55/08* (2013.01); *A23L 1/0255* (2013.01); *A23L 1/0257* (2013.01); *A23L 2/02* (2013.01);
(Continued)

(58) Field of Classification Search
CPC .................... A23L 1/025–1/0257; A23L 2/48; A23L 2/46; A23L 3/001; A23L 3/005; A23L 3/01; A23L 3/02–3/085; A23L 3/14; B65D 81/3453; B65B 55/02; B65B 55/08; B65B 55/16; B67C 3/045; B67C 7/00
USPC ......... 426/234, 241–243, 405–409, 521–522; 422/21
See application file for complete search history.

(56) References Cited

U.S. PATENT DOCUMENTS

| | | |
|---|---|---|
| 1,581,780 A | 4/1926 | Brass |
| 2,010,667 A | 8/1935 | Herold |

(Continued)

FOREIGN PATENT DOCUMENTS

| | | |
|---|---|---|
| CN | 2719427 | 8/2005 |
| CN | 1903661 | 1/2007 |

(Continued)

OTHER PUBLICATIONS

International Search Report from International PCT Application No. PCT/US2011/051071; dated Dec. 20, 2011.

(Continued)

*Primary Examiner* — Drew Becker
(74) *Attorney, Agent, or Firm* — Banner & Witcoff, Ltd.

(57) ABSTRACT

A method for reducing microorganisms (sterilization) in a free-flowing product in a container. The product in the container is radiated with non-ionizing electromagnetic radiation at an energy density sufficient to achieve commercially sterile temperature and is manipulated in a manner to distribute heat and ensure that the product and the container reach a temperature sufficient to commercially sterilize the product and the interior surfaces of the container.

36 Claims, 10 Drawing Sheets

(51) Int. Cl.

| | | |
|---|---|---|
| *A23L 1/025* | (2006.01) | |
| *B67C 7/00* | (2006.01) | |
| *B65B 55/16* | (2006.01) | |
| *A23L 2/02* | (2006.01) | |
| *A23L 2/46* | (2006.01) | |
| *A23L 2/48* | (2006.01) | |
| *A23L 3/00* | (2006.01) | |
| *A23L 3/005* | (2006.01) | |
| *A23L 3/01* | (2006.01) | |
| *A23L 3/02* | (2006.01) | |
| *A23L 3/04* | (2006.01) | |
| *A23L 3/06* | (2006.01) | |
| *B67C 3/04* | (2006.01) | |

(52) U.S. Cl.
CPC ... *A23L 2/46* (2013.01); *A23L 2/48* (2013.01); *A23L 3/001* (2013.01); *A23L 3/005* (2013.01); *A23L 3/01* (2013.01); *A23L 3/022* (2013.01); *A23L 3/04* (2013.01); *A23L 3/06* (2013.01); *B65B 55/16* (2013.01); *B65D 81/3453* (2013.01); *B67C 3/045* (2013.01); *B67C 7/00* (2013.01)

(56) References Cited

U.S. PATENT DOCUMENTS

| | | | |
|---|---|---|---|
| 2,199,459 A | 5/1940 | Herold et al. | |
| 2,265,803 A * | 12/1941 | Davis | 366/211 |
| 2,487,033 A | 11/1949 | Thurman et al. | |
| 2,509,904 A | 5/1950 | Bruce | |
| 2,517,542 A * | 8/1950 | Clifcorn et al. | 426/405 |
| 2,617,635 A | 11/1952 | Oswald | |
| 2,748,005 A | 5/1956 | Baier | |
| 2,920,552 A * | 1/1960 | Kaap | 99/371 |
| 3,119,139 A | 1/1964 | Beard | |
| 3,336,722 A | 8/1967 | Der Winden et al. | |
| 3,494,724 A * | 2/1970 | Gray | 422/21 |
| 3,619,203 A | 11/1971 | Heck et al. | |
| 3,674,422 A * | 7/1972 | Gray | 422/307 |
| 3,737,608 A * | 6/1973 | Nagao et al. | 219/700 |
| 3,753,651 A | 8/1973 | Boucher | |
| 3,885,915 A * | 5/1975 | Utsumi et al. | 422/21 |
| 4,031,764 A | 6/1977 | Curtis | |
| 4,080,974 A | 3/1978 | Oag | |
| 4,148,390 A | 4/1979 | Ionescu | |
| 4,208,761 A | 6/1980 | Ionescu | |
| 4,533,038 A | 8/1985 | Richard | |
| 4,596,469 A | 6/1986 | Huntsinger et al. | |
| 4,808,782 A * | 2/1989 | Nakagawa et al. | 219/701 |
| 4,817,777 A | 4/1989 | Postel | |
| 4,822,967 A * | 4/1989 | Kumagami et al. | 219/752 |
| 4,838,154 A | 6/1989 | Dunn et al. | |
| 4,861,166 A | 8/1989 | Kuwabara | |
| 4,896,005 A * | 1/1990 | Skubich | 219/700 |
| 4,986,413 A | 1/1991 | Mraz | |
| 5,060,450 A | 10/1991 | Greenwell et al. | |
| 5,119,720 A * | 6/1992 | Rodriguez | 99/517 |
| 5,260,019 A * | 11/1993 | Petersen | 422/21 |
| 5,277,207 A | 1/1994 | Perrier | |
| 5,279,788 A * | 1/1994 | Kudo et al. | 422/21 |
| 5,320,804 A | 6/1994 | Zakaria et al. | |
| 5,343,998 A | 9/1994 | Depinet et al. | |
| 5,358,092 A | 10/1994 | Cinotti | |
| 5,411,250 A | 5/1995 | Belec et al. | |
| 5,540,318 A | 7/1996 | Hulse | |
| 5,792,421 A | 8/1998 | Riley | |
| 5,810,151 A | 9/1998 | Catelli et al. | |
| 5,957,264 A | 9/1999 | Carey | |
| 5,968,451 A | 10/1999 | Iwamoto | |
| 6,248,986 B1 | 6/2001 | Tran et al. | |
| 6,298,638 B1 | 10/2001 | Bettle | |
| 6,328,928 B1 | 12/2001 | Schroeder et al. | |
| 6,537,492 B1 * | 3/2003 | Søgaard | 422/21 |
| 6,537,493 B1 | 3/2003 | Mednikov | |
| 6,973,767 B2 | 12/2005 | Wagner et al. | |
| 7,025,192 B2 | 4/2006 | Hoeg et al. | |
| 7,032,737 B2 | 4/2006 | Egger | |
| 7,066,316 B2 | 6/2006 | Burger et al. | |
| 7,169,420 B2 | 1/2007 | Korengel et al. | |
| 7,299,832 B2 | 11/2007 | Hartness et al. | |
| 7,518,260 B2 | 4/2009 | Dai et al. | |
| 7,553,064 B2 | 6/2009 | Johnson et al. | |
| 7,581,635 B2 | 9/2009 | Lecomte | |
| 8,079,376 B2 | 12/2011 | Avelis et al. | |
| 2002/0083682 A1 | 7/2002 | Edwards et al. | |
| 2004/0005242 A1 * | 1/2004 | Koulik et al. | 422/22 |
| 2005/0019209 A1 * | 1/2005 | Burger et al. | 422/23 |
| 2007/0012334 A1 | 1/2007 | Wolters | |
| 2007/0051073 A1 | 3/2007 | Kelley et al. | |
| 2007/0101681 A1 | 5/2007 | Iwashita et al. | |
| 2007/0180796 A1 | 8/2007 | Wild et al. | |
| 2009/0101178 A1 | 4/2009 | Wu et al. | |
| 2010/0297313 A1 * | 11/2010 | Koulik et al. | 426/234 |
| 2011/0123690 A1 * | 5/2011 | Zavadtsev Koulik et al. | 426/234 |
| 2012/0060445 A1 | 3/2012 | Graham et al. | |
| 2012/0093687 A1 * | 4/2012 | Snowball | 422/23 |
| 2012/0251681 A1 | 10/2012 | Zacharias | |

FOREIGN PATENT DOCUMENTS

| | | |
|---|---|---|
| EP | 0455513 | 11/1991 |
| EP | 0968661 | 1/2000 |
| EP | 1747997 | 1/2007 |
| GB | 464568 | 4/1937 |
| GB | 1014014 | 12/1965 |

OTHER PUBLICATIONS

U.S. Office Action from U.S. Appl. No. 12/879,611; dated Mar. 12, 2013.

International Preliminary Report from International PCT Application No. PCT/US2011/051071; dated Mar. 21, 2013.

International Preliminary Report in related International Patent Application No. PCT/US2011/051071 dated Mar. 21, 2013.

International Search Report and Written Opinion from International PCT Application No. PCT/US13/68074, dated Mar. 4, 2014.

CN Application No. 201180052406.9 Office Action mailed Dec. 27, 2013

* cited by examiner $$LR = \frac{1}{D_{Ref}} \int_0^t 10^{(T(t')-T_{Ref})/z} \, dt',$$

LOG REDUCTION IS EXPONENTIAL WITH TEMP AND LINEAR WITH TIME

IN-PACKAGE NON-IONIZING ELECTROMAGNETIC RADIATION STERILIZATION

RELATED APPLICATIONS

This present application is a non-provisional application which claims the benefit of provisional U.S. Application No. 61/561,467 filed on Nov. 18, 2011, and the present application is a continuation-in-part (CIP) and claims benefit of U.S. Ser. No. 12/879,611 filed Sep. 10, 2010, which applications are incorporated herein by reference in their entireties and made a part hereof.

FIELD OF THE INVENTION

The disclosure relates to methods for non-ionizing electromagnetic sterilization, including microwave and radiofrequency sterilization, of a food or beverage product in a container.

BACKGROUND

Numerous types of foods, including beverages, are packed in containers, including cans, glass bottles, or polyethylene terephthalate (PET) bottles. Many times, the foods need to be heated for cooking and/or need to be pasteurized, and the insides of the containers need to be sterilized. Various methods have been developed to reduce or eliminate the need for preservatives to preserve foods and increase shelf life.

Hot-fill sterilization of containers, such as bottles containing beverages, is a well-known method for sterilizing containers to render the container essentially free of microorganisms and microbial growth. Typically, hot-fill sterilization is achieved by heating a liquid to a temperature of at least about 185 degrees Fahrenheit (85 degrees Celsius) using a thermal process, for example, electrical resistance heating or a heat exchanger arrangement. After this heating of the liquid, the heated liquid is placed in a holding tube to maintain the temperature of the fluid for a sufficient amount of time so that the liquid is sterilized from commonly found microorganisms. The heated liquid is then filled into containers. Prior to cooling the containers, the containers are often manipulated to ensure that the hot liquid comes into contact with all of the interior surfaces of the containers, including any container closures (e.g., caps). Such manipulation generally involves tilting or inverting the containers to contact the hot liquid with all of the interior container surfaces for a time sufficient to sterilize the inside of the containers and their respective closures. Once the containers have been completely sterilized, they may then be cooled and safely stored as a shelf stable product without refrigeration, usually for at least three months.

There are drawbacks to conventional hot-fill sterilization. Certain liquids, for instance beverages, contain solid inclusions (e.g., particles) as well as liquid. Inclusions, however, may agglomerate within small portions of a container, such as the neck and/or cap of a bottle. The agglomeration of inclusions may inhibit hot liquid from reaching those portions of the container during manipulation, and result in a container that is not completely sterilized. For instance, one inversion method that has shown to result in agglomeration of inclusions in the neck is the so-called "laydown method." The laydown method involves tilting a hot-filled bottle from a vertical standing position to a horizontal lie-down position, over a time period of about 1-2 seconds. The bottle remains in this position for a specified amount of time, and then is raised back to a vertical standing position. Another inversion method that has shown agglomeration of inclusions in the neck is the so-called "camel hump inverter." The camel hump inverter method involves grabbing a vertical upright bottle by rubber grippers and tilting the bottle until it is tipped 90 degrees on its side. The bottle is transferred to an upright position when it reaches the top of the inverter, and then is tilted 90 degrees on its side in the opposite direction. Accordingly, it would be desirable to prevent agglomeration of inclusions in portions of a container to ensure proper sterilization of the interior of the container.

Another sterilization method is sometimes referred to as tunnel sterilization or tunnel pasteurization. Conventional tunnel sterilization typically involves filing a container, such as a bottle, with a food, such as beverage, and then closing the container, such as capping a bottle. Containers or bottles are loaded at one end of a tunnel and passed under sprays of hot water as they move along a conveyor. The sprays are arranged so that the bottles are subjected to hot water until the pasteurization temperature of the beverage is reached. This also has the effect of sterilizing the container. The bottles are then cooled with sprays of cool water until they are discharged from the end of the tunnel. Conventional tunnel sterilization typically involves use of a fuel-burning boiler to produce steam, the steam is then cooled to produce hot water, and the hot water is then sprayed over the capped bottles as they move along the conveyor. Conventional tunnel sterilization has an energy efficiency of about 30-50%, i.e., about 30-50% of the amount of heat (which may be expressed in British Thermal Units, i.e., BTU) generated by a fuel-burning boiler is actually delivered into the product. Conventional tunnel sterilization also typically requires 10 minutes or more, and frequently at least 20 minutes or more to achieve sufficient pasteurization of the beverage and sterilization of the interior surfaces of the container. For example, conventional tunnel sterilization typically requires the product be heated with sprayed hot water for about 10-12 minutes in "a come up" zone of the tunnel until the product reaches a temperature of about 160 degrees Fahrenheit, and then be held at that temperature for about another 10 minutes at this target temperature. The longer a product and container are subjected to high temperatures, the greater the risk of thermal abuse of the product and the container, leading to a greater risk of adverse taste, and degradation of the product and the container. Conventional tunnel sterilization may not be possible for certain products and/or containers, or may require an increase in the thickness of containers, e.g., increasing the thickness of PET bottles to achieve sterilization of PET bottles filled with beer to ensure a sufficiently strong bottle after sterilization.

Aseptic sterilization is another way to sterilize the interior surfaces of containers. In a typical aseptic sterilization, a container is sterilized with an aqueous solution of hydrogen peroxide ($H_2O_2$) to achieve a germ-killing effect, and a pasteurized product is then filled into the sterilized bottle. The pasteurized product is typically heated using a thermal heating process, and held at a pasteurization temperature for a sufficient period of time e.g., in a centralized tank and/or holding tube (similar to that used in hot-fill sterilization), then allowed to cool prior to being placed in a sterilized bottle. The equipment used for aseptic sterilization typically costs many millions of dollars and is much more expensive than equipment for tunnel sterilization. Changing a production line from a hot-fill sterilization or tunnel sterilization to aseptic sterilization entails high conversion costs.

The above methods typically have a large carbon footprint in that they typically require heating of product using a thermal process, for example, heating the product with electrical resistance heating or a heat exchanger arrangement (such as for conventional hot-fill and aseptic sterilization), or in the case of conventional tunnel sterilization, heating the product with hot water, which is generated from steam from a fuel burning boiler. It would be desirable to achieve sterilization of product and the interior surfaces of containers filled with product that has a lower carbon footprint and is more energy efficient than sterilization methods that use thermal process heating. It would be also be desirable to achieve sterilization of product and the interior surfaces of containers filled with product using methods that increase production rates over conventional methods.

Microwave energy or radiation has been used to heat product to provide longer shelf life, thus enabling central preparation of products for shipping. Commercial food preparation and packaging processors have found it difficult, however, to use microwave energy to increase production rates.

Various methods for increasing heating rate with intent of increasing production rates are known. One known method is to use pulse microwave energy radiation; another is simultaneous use of multiple sources of microwave energy, such as, for example, irradiation from several directions. In these various methods, microwave energy has been used both before and after product is packaged. However, containers often are damaged because a local product temperature exceeds the service temperature of the container, and organoleptic properties and characteristics of the product often are degraded by long periods of exposure to a locally high temperature in the product.

Thus, none of these known methods using microwave energy is satisfactory. Known methods using microwave energy result in unevenly-heated product that do not ensure sufficient shelf life. Known methods using microwave energy also have not been successful at significantly shortening processing time, and organoleptic properties and characteristics of product often are degraded, and containers often are damaged.

Therefore, there exists a need for a method for sterilization of product, especially food product, which reduces processing time without damaging containers and without degrading organoleptic properties and characteristics of the product, yet does not have the disadvantages of prior methods. It would also be desirable to achieve sterilization of product and interior surfaces of containers for products and containers not achievable using conventional methods and/or at a lower cost than conventional methods.

SUMMARY

Embodiments of the disclosure are directed to methods for the reduction of microorganisms to achieve commercially sterile product in a container.

In one aspect, a method may comprise providing a closed container, the closed container comprising a free-flowing product disposed within the closed container, and conveying the closed container through a non-ionizing electromagnetic radiation apparatus during a conveying time period. The method includes transmitting non-ionizing electromagnetic radiation from the non-ionizing electromagnetic radiation apparatus to the free-flowing product to achieve a sterilization temperature during a transmitting time period, at least a portion of the transmitting time period overlapping with a least a portion of the conveying time period. The method includes manipulating the closed container during a manipulating time period to achieve sterilization of the entirety of the product within the closed container and the entirety of interior surfaces of the closed container, at least a portion of the manipulating time period overlapping with at least a portion of the transmitting time period.

In one embodiment, the method may comprise providing a closed container, the closed container comprising a free-flowing product disposed within the closed container, the container comprising a base, placing the closed container vertically upright on the container base, and subjecting the closed container to non-ionizing electromagnetic radiation sufficient to achieve commercial sterilization temperature. The method may comprise subjecting the closed container to an inversion sequence, the inversion sequence comprising a first inversion of the container until the container base is located at an angle of up to 180 degrees relative to vertical, wherein the first inversion occurs over a time period of at least three seconds, and wherein the inversion sequence allows for sterilizing of interior surfaces of the container.

Another aspect comprises a system for sterilizing containers. The system comprises a conveyor configured to convey a plurality of closed containers for a conveying time period, the plurality of containers comprising free-flowing product disposed within the closed containers. The system comprises a non-ionizing electromagnetic radiation apparatus configured to transmit non-ionizing electromagnetic radiation to the free-flowing product to achieve a sterilization temperature during a transmitting time period. The conveyor is configured to convey the plurality of closed containers through the non-ionizing electromagnetic radiation apparatus during a conveying time period, at least a portion of the conveying time period overlapping with at least a portion of the transmitting time period. At least a portion of the conveyor is configured to manipulate the plurality of closed containers during a manipulating time period to achieve sterilization of the entirety of the product within each of the plurality of the closed containers and the entirety of interior surfaces of each of the plurality of the closed containers. At least a portion of the manipulating time period overlaps with at least a portion of the transmitting time period.

DETAILED DESCRIPTION

Figure 1:
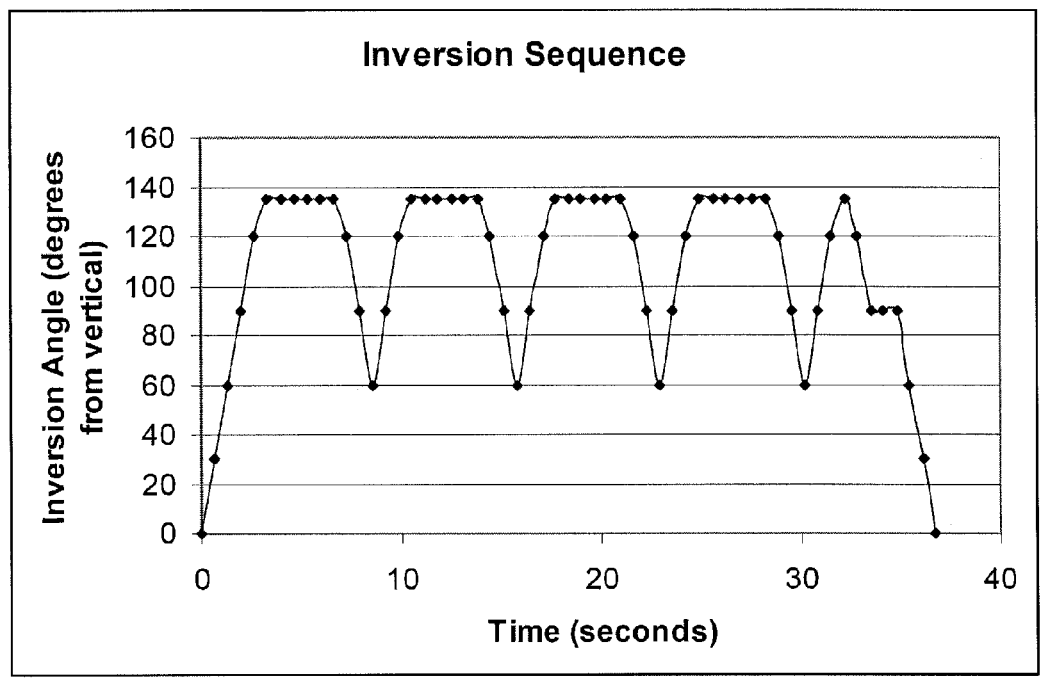
FIG. 1 is a graph of a sample manipulation sequence showing inversion angle versus time.

Embodiments of the disclosure are directed to a method for commercially sterilizing product in a container. Those of ordinary skill in the art recognize industry standards and guidelines for commercial sterilization. Those of ordinary skill in the art recognize that the FDA Juice HACCP rule published in 2001 sets forth a minimum 5 log reduction targeting specific pathogenic microorganisms in juice, and that for shelf stable products, manufacturers desire processing that minimizes spoilage type organisms. For example, package sterilization may be a 6 log reduction of spores of the bacteria *Bacillus subtillis* var. *globigii*. See e.g., U.S. Pat. No. 6,752,959, assigned to PepsiCo, Inc. Also, as outlined by the FDA CFR Title 21 Chapter 1 part 110, current good manufacturing practices in the manufacturing, packaging, or holding human food is to be followed. Non-ionizing electromagnetic radiation has been approved by the FDA, see e.g., 21 CFR Section 179.30.

In particular, embodiments of the disclosure are directed to a method for commercially sterilizing product, including food product (e.g., beverages) in a container using non-ionizing electromagnetic radiation to heat the product, including microwave (MW) and radio frequency (RF) radiation. The frequencies of the energy contemplated in the embodiments of the disclosure includes the radio frequencies (RF) in the range typically either in the KHz range (3 KHz<f<1 MHz) or in the MHz range (1 MHz<f<300 MHz), and microwave frequencies (MW) in the range typically between 300 MHz and 300 GHz. Thus, the RF and MW frequencies permitted for domestic, industrial, scientific and medical applications may also be used in accordance with the disclosed embodiments, including but not limited to frequencies of 13.56 MHz, 27.12 MHz, and 40.68 MHz (all of which are RF), and 915 MHz, 2,450 MHz, 5.8 GHz, and 24.124 GHz (MW).

Other embodiments of the disclosure are directed to a method for commercially sterilizing free-flowing food product in a container using non-ionizing electromagnetic radiation and manipulating the container to ensure sufficient heating of the entirety of the product and the container to achieve commercial sterilization without damaging the container and without degrading the organoleptic properties and characteristics of the food product.

Still other embodiments of the disclosure are directed to a method for quickly commercially sterilizing free-flowing food products in a container using non-ionizing electromagnetic radiation and manipulating the container to ensure sufficient heating of the entirety of the product and the container to achieve commercial sterilization without damaging the container and without degrading organoleptic properties and characteristics of the food product.

Known methods for heating product to extend shelf life using non-ionizing electromagnetic energy or radiation do not significantly shorten the time required to achieve commercial sterilization as compared, for example, to typical heating methods. However, the inventors have discovered that sufficient non-ionizing electromagnetic energy or radiation can be imparted to a product in a container within about 30 seconds to achieve commercial sterilization temperature, and if the irradiated container is manipulated in a manner that causes the product to mix and the heat to be distributed throughout the product and to the interior surfaces of the container, commercial sterilization of the entirety of the product and the interior surfaces of the container may be achieved in less than 3 minutes, and may be achieved in about 1-2 minutes.

In embodiments of the method, product is subjected to non-ionizing electromagnetic radiation after it is packaged. The package, or container, which can be open or closed, is subjected to non-ionizing electromagnetic radiation sufficient to achieve commercial sterilization. Typically, energy sufficient to achieve commercial sterilization temperature, even in low-acid product, can be imparted to the product in less than about 30 seconds.

The skilled practitioner recognizes that the severity of the heat treatment required to achieve commercial sterilization of a food product is related to the acid level in the product. High-acid foods, i.e., foods having a pH less than about 4.0, require lower temperatures or shorter time at temperature than do medium-acid foods having a pH of greater than about 4.0 to 4.6, and low-acid foods having a pH of 4.6 and greater to achieve commercial sterilization. As used herein, high-acid foods include acidified foods comprising medium-acid and low-acid foods to which acid(s) or acid food(s) are added, and have a finished equilibrium pH of about 4.0 or less, and medium-acid foods include foods comprising medium-acid and low-acid foods to which acid(s) or acid food(s) are added, and have a finished equilibrium pH of about 4.0 to 4.6.

In embodiments of the disclosure, the temperature of a food product is raised to at least a target temperature so that essentially the entirety of the food product and the interior of the container can be maintained at the target temperature for a time sufficient to achieve commercial sterilization. Those skilled in the art will recognize that commercial sterilization as used herein includes, but is not limited to, sterilization as may be identified in governmental regulations and/or guidelines, for example, U.S. Food and Drug Administration ("FDA") guidelines (for further example, see Guidance for Industry, Acidified Foods, *Draft Guidance*, document being distributed for comment purposes only, September 2010 (available at http://www.fda.gov/Food/GuidanceCompilianceRegulatoryInformation/GuidanceDocuments/AcidifiedandLow-AcidCannedFoods/ucm222618.htm, which identifies thermal process lethalities for acidified foods, expressed as Fz/Ref where F is the destruction time, z is the increase in temperature that results in a 90 percent reduction in the D-value, and Ref us the reference temperature, the time required to destroy 90 percent of the vegetative cells or spores at a given temperature is called the decimal reduction time, usually referred to as the "D-value." Those skilled in the art will recognize that the time sufficient to achieve commercial sterilization in accordance with embodiments of the present disclosure can be determined for a particular application, e.g., a particular container filled with a particular product and container, without undue experimentation.

In other embodiments of the disclosure, the temperature of a high-acid food is raised to at least about 85° C. (185° F.), and more typically to at least about 90° C. (194° F.), for a period sufficient to achieve commercial sterilization. Those skilled in the art will recognize that the time sufficient to achieve commercial sterilization in accordance with embodiments of the present disclosure can be determined for a particular application, e.g., a particular container filled with a particular product and container, without undue experimentation. For a carbonated high-acid beverage, the time for which the commercial sterilization step is held at temperature typically is less than about 3 minutes, typically at least about one to two minutes.

As the skilled practitioner recognizes, the period during for which commercial sterilization temperature is maintained typically is longer at a lower temperature, whether for a low-acid, a medium-acid, or a high-acid product. These temperature and time relationships for low-acid, medium-acid, and high-acid foods are well-known, and typically do not change as the source of energy for the commercial sterilization changes. With the guidance provided herein, the skilled practitioner will be able to determine both an appropriate temperature and the period required to achieve commercial sterilization at that temperature for any product and container without undue experimentation.

As used as it relates to embodiments of the disclosure, "commercial sterilization" means that condition at which pathogens and other product spoilants are reduced to a level that enables storage, typically at ambient conditions ("room temperature"), for the 'shelf life' of the product, i.e., that period sufficient to deliver wholesome, safe food to a customer for later use. Commercial sterilization thus is a heat treatment sufficient to afford the product a reasonable shelf life.

The method of embodiments of the disclosure is applicable to foods of all acidity levels, as described above. Thus-treated product remains safe for consumption for at least a period equal to the shelf-life. Prolonged shelf life makes it possible to provide products at reasonable cost. The method of embodiments of the disclosure affords the possibility of significantly reducing or eliminating the need for typical chemical preservatives (for example, benzoates, sorbates, and other known preservatives).

Liquids of all types, including beverages of all types, meal replacement products, clear broths, and energy drinks, often are commercially sterilized. Medical solutions, such as saline solution or glucose solution, also must be sterile. These products or components thereof of various types can be commercially sterilized using microwave energy. Similarly, food products containing solids also can be commercially sterilizing using non-ionizing electromagnetic energy or radiation.

In embodiments of the disclosure, food products containing solids are treated to attain commercial sterilization. Such food products typically are 'free-flowing' products, i.e., the product flows in the container in a manner that enables product at commercial sterilization temperature to contact the entirety of the interior of the container. As the skilled practitioner recognizes, it is necessary to ensure contact of the product at commercial sterilization temperature with the entirety of the interior of the container to ensure that the thus-contacted surfaces are raised to an appropriate temperature for a time sufficient to achieve commercial sterilization.

Therefore, embodiments of the disclosure are directed to commercial sterilization of products that contain solids that have properties and characteristics that enable the product to contact the entirety of the interior of the container. As used herein, such products are identified as "free-flowing." The product may contain solids, but the solids in a free-flowing product do not preclude product from contacting the entirety of the interior of the container.

Typical free-flowing products include sauces that have, for example, bits of herbs and spices, or small pieces of vegetables and other inclusions; both cream-based and broth-based soups; stews; and beverages that contain solid bits, such as fruit juices and fruit smoothies. These and other products typically are free-flowing products that can be commercially sterilized in accordance with embodiments of the disclosure.

Products that are semi-solid, gel-like, or viscous, such as for example, cheese sauce, also are commercially sterilized in accordance with embodiments of the disclosure. Such products often adsorb non-ionizing electromagnetic energy or radiation efficiently and become less viscous when heated. Therefore, such products can be considered free-flowing product and are commercially sterilized in accordance with embodiments of the disclosure.

In embodiments of the disclosure, the container is filled with product at any temperature and is heated to commercial sterilization temperature by irradiation with non-ionizing electromagnetic radiation. The inventors have discovered that non-ionizing electromagnetic radiation or energy input can be higher and/or for a shorter period of time than has been achievable in known methods, particularly known methods using irradiation with non-ionizing electromagnetic energy or radiation, if the container containing the product is manipulated to distribute the heat imparted to the product in an efficient way. The inventors have discovered that by manipulating the container filled with product, commercial sterilization is achieved, without damaging containers and degrading a product's organoleptic properties and characteristics due to a local product temperature exceeding the service temperature of the container, and/or long periods of exposure to a locally high temperature in the product that arise in known methods.

In accordance with embodiments of the disclosure, the temperature of the product may be raised from product production temperature, typically an ambient temperature, to commercial sterilization temperature within about 30 seconds by irradiation with non-ionizing electromagnetic radiation at sufficiently high density energy, followed by closure of the container, if necessary, and manipulation of the container. About another 30 to about 90 seconds may be required for redistribution of heat in the container. The container then is cooled. Thus, embodiments of the disclosure are much faster than conventional retorting and essentially as fast as aseptic filling. Thus, time is saved as compared with conventional retorting, and money is saved as compared with aseptic filling, as neither the pre-filled containers nor the filling portion of the production line need be kept in commercially sterile condition.

In accordance with embodiments of the disclosure, the short heating period is made possible by high energy input. The heat redistribution period eliminates hot spots and ensures that heat is distributed throughout the contents of the container so that the required commercial sterilization temperature is reached throughout the product. In particular, this redistribution is carried out by tilting or inverting the container from the vertical axis. The changing orientation causes the product to mix and a uniform temperature throughout the product to be achieved, by both mechanical mixing and convection.

The inventors have discovered that manipulation of the product in a manner that utilizes both convection and mechanical mixing to distribute heat in a liquid or free-flowing product affords the opportunity to introduce a quantity of heat sufficient to reach commercial sterilization temperature in a shorter period than does irradiation with microwave energy with subsequent typical bottle transport. Therefore, time is saved over conventional heating and retorting, and over conventional methods for heating with microwave energy.

The inventors also have discovered that appropriate apparatus for irradiating with non-ionizing electromagnetic radiation and manipulating the container simply can be added to a product manufacturing line. Product need only be packaged, heated by irradiation with non-ionizing electromagnetic radiation or energy, manipulated, and cooled. Thus, the apparatus is much simpler than an aseptic packaging line, which must be kept closed and commercially sterile, yet produces commercially sterile product in essentially the same short time.

In accordance with embodiments of the disclosure, product is heated in a container. In selected embodiments of the disclosure, the container is open until after the product is heated. In other embodiments of the disclosure, product is loaded into a container and the container is sealed before irradiation. Heating is carried out by irradiation with non-ionizing electromagnetic energy or radiation to achieve energy input sufficient to yield commercial sterilization temperature throughout the product in a period of less than about 30 seconds. As described above, commercial sterilization temperature is related to the acidity level of the product in the container.

The amount of heat that is introduced is sufficient to raise the temperature of the product in the container to commercial sterilization temperature from ambient temperature.

In preferred embodiments of the disclosure, the container is closed or sealed prior to subjecting the product to non-ionizing electromagnetic energy or radiation. The sealed container of heated product then is manipulated to distribute heat throughout the product to achieve commercial sterilization temperature throughout the product and the interior of the container for a time sufficient to commercially sterilize both product and container. Manipulation in accordance with embodiments of the disclosure changes the orientation of the container from vertical or essentially vertical through various degrees of tilt from vertical or essentially vertical and may be past horizontal. In embodiments of the disclosure, the container is inverted or essentially inverted, then returned through a tilted position to essentially vertical. This sequence may be repeated to distribute heat by convection within the product. In accordance with embodiments of the disclosure, the skilled practitioner will recognize that containers may be tilted to ensure that product heats the entirety of the interior surfaces of the containers. Thus, in embodiments of the disclosure, manipulation of containers may be in accordance with tilting techniques used in conventional hot-fill sterilization or in accordance with the manipulation techniques disclosed in U.S. Ser. No. 12/879,611, the entirety of which is incorporated herein by reference. For example, in accordance with the present disclosure, manipulation involves tilting or inverting the containers to contact the hot liquid with all of the interior container surfaces for a time sufficient to sterilize the inside of the containers and their respective closures. Once the containers have been completely sterilized, they may then be cooled and safely stored as a shelf stable product without refrigeration, usually for at least three months. Those of ordinary skill in the art will recognize that in accordance with the present disclosure, if the filled containers are to be stored under refrigeration conditions, then the electromagnetic radiation treatment may be run at lower temperature and/or shorter time. The manipulation may comprise tilting about a vertical axis in combination with rotation about a longitudinal axis of the container. In preferred embodiments, the manipulation comprises more than one inversion about a vertical axis or rotation of a container about a longitudinal axis of the container to ensure sufficient distribution of heat throughout the product so as to avoid degradation of organoleptic properties and characteristics and, possibly, damage to the container due to local overheating of product.

The inventors have discovered that free-flowing product also can be packaged and commercially sterilized in accordance with embodiments of the disclosure.

For convenience, embodiments of the disclosure will be described with particularity for a method that is particularly effective at distributing within a container a free-flowing product that contains agglomerating inclusions, such as fruit sacs, that may interfere with flow of product within a container. This embodiment ensures that all portions of the interior of the container are heated to commercial sterilization temperature. This method is particularly effective at ameliorating agglomeration of inclusions to make the product free-flowing. However, other methods of manipulating a container that include sufficient re-orientation of the container, including essentially inverting the container, to take advantage of both mechanical and convection mixing within the container, suitably is used in embodiments of the disclosure. With the guidance provided herein, the skilled practitioner will be able to establish a suitable manipulation procedure without undue experimentation.

In accordance with embodiments of the disclosure a container comprising a heated product is manipulated in a particular inversion sequence that is particularly effective in manipulation of a container containing a liquid having a plurality of agglomerating inclusions. In accordance with embodiments of the disclosure, heating of the product is achieved by transmitting non-ionizing electromagnetic radiation to the product. The inversion sequence may comprise at least a first inversion of the container until the base is located at an angle of up to 180 degrees relative to vertical and may occur over a time period of at least three seconds. The inversion sequence allows for heat distribution throughout the product, and allows the product to contact the inside surfaces of the container for a time sufficient to commercially sterilize the product and the inside surfaces of the container.

Embodiments of the disclosure may comprise an inversion sequence comprising more than one inversion, and may comprise as many as about eight inversions. These inversions may occur over a period of at least about thirty seconds. In other embodiments of the disclosure, the inversion sequence is repeated in its entirety at least once, and in some embodiments of the disclosure, twice.

In embodiments of the disclosure, an apparatus for inverting containers comprises a conveyor for a plurality of containers and an enclosure for preventing the plurality of containers from falling off the conveyor. The conveyor is configured to subject the plurality of containers to a series of angles as the plurality of containers is conveyed. The conveyor is configured to subject the plurality of containers to one or more inversion sequences comprising a first inversion of the containers to an angle of up to 180 degrees relative to vertical, occurring over a time period of at least three seconds. The inversion sequence mixes the product by agitation and by convection, essentially preventing inclusions from agglomerating in the closure of the container, and allows the hot product to mix and to contact the interior of the container for a time sufficient to sterilize the interior surfaces of the container.

The skilled practitioner recognizes that inclusions may tend together in the neck portion of a beverage bottle which generally comprises a base portion, a body portion, a neck portion, and a separate cap. With respect to such bottles, the embodiments of the disclosure described in detail herein aid in preventing inclusions from collecting in a neck portion or the interior of a cap during inversion, thereby allowing the hot-filled liquid to sterilize the neck portion and cap interior, as well as the rest of the container.

The inventors have discovered that it is possible to decrease the time required to commercially sterilize liquids and free-flowing product in a container by irradiating the filled container with non-ionizing electromagnetic radiation or energy at a high energy density in a short period, and then manipulating to change the orientation of the container, including inversion. This manipulation of the heated, filled container distributes the heat by mechanically mixing and by taking advantage of convection, for example, the tendency of a hot fluid to rise in cooler fluid and establish circulation in the container. The mixing induced in the container by the post-heating manipulation quickly ameliorates "hot spots," i.e., localized pockets of fluid having temperature above that of the surrounding fluid, and ensures that the temperature throughout the fluid reach commercial sterilization quickly. This reduction of the temperature enables quickly raising the temperature to a higher than typical temperature with the knowledge that the manipulation technique will quickly distribute the heat throughout the product. Thus, heat at high energy density can be imparted by irradiation with non-ionizing electromagnetic radiation or energy at high energy density. The irradiation may be concurrent with and/or followed by manipulation, including inversion, as set forth below.

Thus, embodiments of the disclosure are directed to heating products in a container with a high energy density, such as non-ionizing electromagnetic radiation, until sufficient heat has been introduced into the product to attain commercial sterilization temperature throughout. The container is sealed, if necessary, and manipulated to, inter alia, invert the container to mix the product therein by both mechanical mixing and convection mixing. Thus, the container is heated, manipulated, and cooled.

In embodiments of the disclosure, the rate at which the containers are manipulated, and in particular are inverted, depends, inter alia, upon the viscosity of the product. As the skilled practitioner recognizes, more viscous product will flow more slowly than less viscous product. Thus, steps must be taken during manipulation to ensure that all container surfaces are heated as required. A longer time is required for a viscous material to flow than the period for a less viscous product. Consideration must be given to ensuring that heat is distributed and that inclusions (if present) do not clump or agglomerate during manipulation. With the guidance provided herein, the skilled practitioner will be able to appropriately manipulate a container without undue experimentation.

In other embodiments of the disclosure, a manipulation sequence that both distributes heat and ensures that inclusions do not clump or agglomerate is used if the product is not only liquid, but rather is a free-flowing product containing inclusions.

Thus, some embodiments of the disclosure are directed to an inversion sequence that will provide a series of angles that will bring the liquid into contact with all of the interior surfaces of the container while preventing any inclusions from agglomerating in any portions of the container to an extent that the interior container or closure surface is blocked from sterilization by the liquid. The specific angles and the rate at which the container is inverted to achieve those angles are involved in achieving complete sterilization of the product and the inside or interior surfaces of the container.

Referring to FIG. 1, a graph is provided showing an exemplary inversion sequence for manipulation in accordance with embodiments of the disclosure. In particular, this sequence is particularly effective at preventing agglomeration of inclusions, such as citrus fruit sacs in a liquid. This sequence is also effective at distributing heat throughout the entirety of product in a container, such as heat generated by subjecting the product to non-ionizing electromagnetic radiation. This sequence is also effective at allowing heated product to contact and sterilize the interior surfaces of a container, including any closure cap or seal. The graph shows that the container is initially inverted zero degrees, corresponding to the container being placed upright, typically on a base of the container. When the container is a beverage bottle, an inversion angle of zero degrees means that the container is placed on its base and its cap is pointing vertically upward from the base. Next, according to FIG. 1, the container is inverted to 30 degrees, 60 degrees, 90 degrees, 120 degrees, and 135 degrees relative to vertical. This inversion to 135 degrees typically occurs over a time period of greater than three seconds. Once the container has been inverted to 135 degrees, it typically remains at that inversion angle for over three seconds. The container is next inverted back to just 60 degrees relative to vertical over a time period of about two seconds, and then returned to an inversion angle of 135 degrees again over about two seconds and subsequently held at 135 degrees relative to vertical for more than another three seconds. As illustrated by the graph of FIG. 1, the container is inverted between 135 degrees and 60 degrees numerous times to ensure sufficient contact between heated liquid and the upper portions of the container while preventing the inclusions from blocking the interior surface of the upper portions of the container. This inversion is also effective at distributing heat throughout the entirety of product in a container, the heat generated by subjecting the product to non-ionizing electromagnetic radiation while in the container. This sequence is also effective at allowing heated product to contact and sterilize the interior surfaces of a container, including the interior surfaces of the cap.

Figure 2:
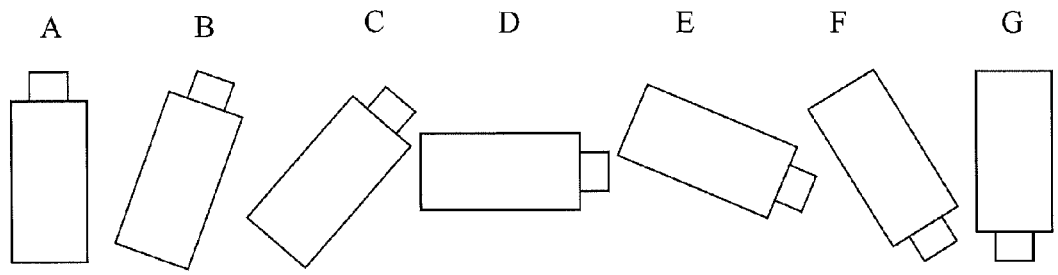
FIG. 2 illustrates containers A through G positioned at various inversion angles relative to vertical.

Referring to FIG. 2, containers A through G are shown, with container A located upright, positioned at zero degrees relative to vertical. Containers B and C are each positioned at angles in between zero and 90 degrees relative to vertical, whereas container D is positioned an angle of 90 degrees relative to vertical. Likewise, containers E and F are each positioned at angles in between 90 and 180 degrees relative to vertical, whereas container G is positioned an angle of 180 degrees relative to vertical.

Inversion of a container to an angle of greater than about 90 degrees relative to vertical assists in causing the liquid to flow to the upper end of the container, and holding at that angle provides time for the hot liquid to sterilize the container. In addition, the inversion from the selected angle back to an angle of less than about 90 degrees causes the inclusions to flow away from the upper end of the container and thereby prevents the inclusions from agglomerating at the upper end. Concomitantly, for sterilization of a container shaped differently than a typical beverage bottle described herein, the angles of inversion will be selected to prevent the inclusions from agglomerating in whichever area of the container is narrow or small. Similarly, the angles of inversion or speed of inversion may be adjusted to accommodate more viscous material, as the skilled practitioner recognizes that more viscous material will flow more slowly and is more likely to trap a gas bubble in the container.

In an embodiment, the container is a closed beverage bottle and is initially placed upright on its base, at zero degrees relative to vertical. The bottle is then subjected to an inversion sequence in which the bottle is inverted to between 45 and 140 degrees relative to vertical. In alternate embodiments, the hot-filled bottle is inverted to between 0 and 180 degrees relative to vertical, such as between 30 and 180 degrees relative to vertical or between 60 and 135 degrees relative to vertical.

Similar to the sequence illustrated in FIG. 1, the inversion sequence according to certain embodiments of the disclosure comprises repeatedly inverting the container back and forth between several selected angles. At least one of the angles is less than 90 degrees with respect to vertical, while at least one of the angles is greater than 90 degrees with respect to vertical. Put another way, at least one of the angles is greater than zero degrees but less than 90 degrees relative to vertical, while at least one of the angles is greater than 90 degrees but less than 180 degrees relative to vertical.

Alternating between inversion of the container at angles greater than 90 degrees and less than 90 degrees initiates the flow of the liquid and inclusions towards the upper end of the container, and then away from the upper end of the container, respectively. In an embodiment, the inversion sequence comprises inverting the container between inversion angles greater than 90 degrees and less than 90 degrees relative to vertical at least three times. In another embodiment, the inversion sequence comprises alternating the inversion angles at least four times, or at least five times. In certain embodiments, the entire inversion sequence is repeated once or twice. Depending on the container type and characteristics of the product, any including inclusions that are present, the inversion sequence may be repeated as many times as necessary to achieve sterilization of the hot-filled container. Alternatively, a first inversion sequence may be followed by a second inversion sequence that comprises inversion angles that are different from the inversion angles of the first sequence.

The amount of time taken to invert a container is critical to achieving sterilization of the container in a reduced time and to successfully preventing inclusions such as fruit sacs, if any, from agglomerating. The manipulation of the container provides the opportunity to shorten total processing time as compared with typical retort processing, or to reduce the complexity of the processing as compared with aseptic packaging. The total time required for heating and manipulation is about the time required for aseptic packaging and is shorter than known methods of irradiation with microwave energy.

Further, other embodiments of the disclosure are directed to packaging and sterilization of free-flowing product, such as liquid with inclusions, such as citrus fruit sacs and the like. In these embodiments of the disclosure, and in embodiments of the disclosure directed to more viscous materials, the speed of the manipulation is reduced because, if a container is inverted too rapidly, the inclusions will be quickly forced towards the upper portion of the container and will thus have a greater likelihood of plugging up the top of the container. In contrast, a slow inversion of the container is analogous to decanting a solution, and the liquid will tend to flow to the upper portion of the container before the inclusions travel to the upper portion of the container.

In an embodiment, the inversion sequence comprises an initial inversion of the container to an angle greater than 90 degrees relative to vertical over a period of from 0.5 to 6.5 seconds, or from 1.0 to 6.0 seconds, or from 1.5 to 5.5 seconds, or from 2.0 to 5.0 seconds, or from 2.5 to 4.5 seconds, or from 3.0 to 4.0 seconds. The time at which the container is held at the maximum inversion angle in the inversion sequence may be from 0.5 to 8.5 seconds, or from 1.0 to 8.0 seconds, or from 1.5 to 7.5 seconds, or from 2.0 to 7.0 seconds, or from 2.5 to 6.5 seconds, or from 3.0 to 6.0 seconds, or from 3.5 to 5.5 seconds. Similarly, the period for returning the container to a smaller inversion angle, such as to an angle less than 90 degrees relative to vertical, occurs over a time period of from 0.5 to 6.5 seconds, or from 1.0 to 6.0 seconds, or from 1.5 to 5.5 seconds, or from 2.0 to 5.0 seconds, or from 2.5 to 4.5 seconds, or from 3.0 to 4.0 seconds. Moreover, each separate inversion of the container to a different inversion angle may be performed over the time periods disclosed above.

As discussed above with respect to FIG. 1, in certain embodiments of the disclosure, once the container has been inverted to the maximum angle of the inversion sequence, it remains at that inversion angle for a certain amount of time, such as for over three seconds. In particular, holding the container in an inverted position for a period allows convection mixing to occur and allows the hot liquid to sterilize the interior of the upper portion of the container. In an embodiment, the container is held at an angle greater than 90 degrees for at least one second, or at least two seconds, or at least three seconds, or at least four seconds, prior to returning the container to an inversion angle of less than 90 degrees.

In certain embodiments of the disclosure, the total time for subjecting a container to a single inversion sequence is at least about 30 seconds, such as from about 15 to about 50 seconds, or from about 20 to about 45 seconds, or from about 25 to about 40 seconds, or from about 30 to about 35 seconds. Accordingly, when a container is subjected to multiple inversion sequences, the container may undergo inversion for the sterilization process for up to several minutes, such as for up to two minutes, or up to three minutes, or up to four minutes, or up to five minutes. Typically, about two minutes is sufficient.

The inversion sequence and timing will depend on several factors, such as the shape and size of container being subjected to the sterilization process, the kind of liquid, and the type of inclusions, if any, present in the liquid. In an embodiment, the container is a beverage bottle, such as a 420 mL or 1000 mL polyethylene terephthalate (PET) bottle. In alternate embodiments, the container is a 355 mL PET bottle, or a 240 mL glass bottle. Typically, embodiments of the disclosure can been applied to almost any PET or glass bottle, or, indeed, any container that is microwave energy transparent, i.e., allows essentially all of the microwave energy to pass through the container and be adsorbed by the product therein.

Many liquids may be commercially sterilized with the sterilization process of embodiments of the disclosures, such as aqueous liquids. For example, but without limitation, the liquid may be a beverage selected from the group consisting of non-carbonated soft drinks, ready-to-drink beverages, coffee beverages, tea beverages, dairy beverages, as well as liquid concentrates, flavored waters, enhanced waters, juice drinks and juice-flavored drinks, sport drinks, and alcoholic products. The sterilization processes may be used with liquids having a viscosity of as low as about 0.2 centipoises up to about 200 centipoises, or up to 100 centipoises, or up to 50 centipoises, or up to 25 centipoises. Typically, the thicker the liquid, the more slowly the container needs to be inverted during the one or more inversion sequences in order to allow the liquid to flow to the upper end of the container upon inversion. A Brookfield Viscometer or a HAAKE Rheometer is a suitable type of equipment used to measure the liquid viscosity for embodiments of the disclosure.

The inclusions provided in the liquid are not particularly limited. In certain embodiments, the inclusions may be fruit components, for instance fruit pulp, fruit vesicles, and/or fruit sacs. Inclusions also may be vegetable bits, meat bits, gelled particles, and herbs and spices.

In exemplary embodiments, the inclusions comprise a wide range of shapes, particle sizes, and densities. The skilled practitioner recognizes that the time selected for each inversion in an inversion sequence will be dependent on the rate at which the particular inclusions flow within the liquid upon inversion of the container. For instance, inclusions having high densities (i.e., mass per unit volume) will travel faster through the liquid and reach the upper end of the container upon inversion more quickly than inclusions having lower densities. Accordingly, the time period selected over which to subject the container to a maximum inversion angle will be longer for a liquid containing particles having a higher density than the time period for a liquid containing particles having a lower density.

Embodiments of the disclosure are directed to free-flowing product. However, the solids in some free-flowing products may agglomerate or otherwise stick together to form clumps that preclude free flow of product onto all areas of the interior of the container. The method of manipulation in accordance with embodiments of the disclosure often will break up such clumps, as described in co-pending application Ser. No. 12/879,611, the entirety of which is incorporated by reference herein. This co-pending application describes a circumstance wherein fruit particle inclusions agglomerate and preclude product flow to all areas of the container.

Embodiments of the disclosure can be applied with any kind of packaging that passes sufficient non-ionizing electromagnetic energy or radiation to the product. Thus, glass and many plastics are suitably used with this method and apparatus. The container also must remit elevated temperatures and should not become misshapen at commercial sterilization temperature.

Figure 3:
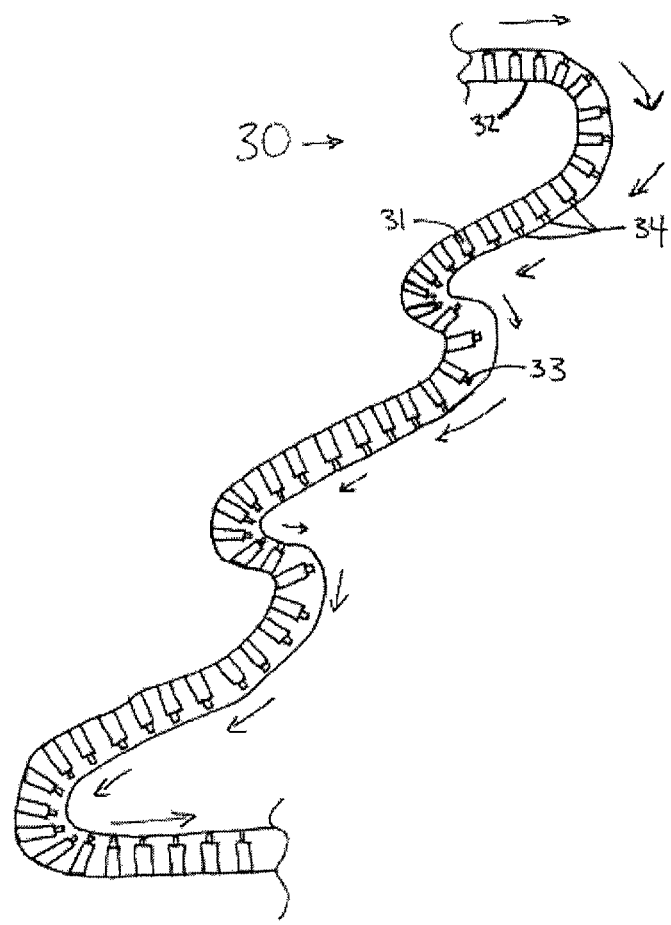
FIG. 3 illustrates a conveyor for an apparatus for manipulating containers and set for a specific manipulation sequence useful in certain embodiments of the disclosure.

A suitable apparatus for use in selected embodiments of the disclosure is illustrated in the drawing figures. Typically, the apparatus comprises a conveyor for a plurality of containers. The conveyor is configured to subject the plurality of containers to a series of angles as the containers are conveyed. A conveyor 30 is illustrated in FIG. 3. The conveyor 30 comprises a conveyor belt 32 configured to affix to and run along a frame (not shown) having a specific design. For instance, according to the embodiment of FIG. 3, the design along which the conveyor belt 32 travels is a kind of "S" shape. The shape is configured such that each of a plurality of containers 34 placed on the conveyor belt 32 is subjected to an inversion sequence. The illustrated inversion sequence begins with the containers placed on the conveyor belt 32 upright, at an angle of zero degrees relative to vertical. As the conveyor belt 32 travels in the direction of the arrows in FIG. 3, the containers 34 undergo a first inversion from zero degrees relative to vertical to an angle of between 90 and 180 degrees, of approximately 135 degrees. As discussed above, the time required to complete the first inversion of the containers is selected according to the characteristics of the containers and both the fluid and inclusions present within the containers.

The frame of the conveyor is configured to next cause the conveyor belt 32 to continue traveling at the same inversion angle for a predetermined period of time to allow the fluid within the containers to remain in contact with the upper portions of the container and sterilize the upper portions of the container. The containers 34 shown in FIG. 3 are containers that each comprises a body 31 and a neck 33, wherein the neck 33 has a smaller diameter than the body 31. Accordingly, the neck 33 of a container 34 in particular undergoes sterilization while the containers 34 are held at the inversion angle between 90 and 180 degrees relative to vertical.

In order to ensure through mechanical mixing and to take advantage of convection, the conveyor belt 32 curves over as it moves, moving the containers 34 such that the containers 34 are passed through lower inversion angles, such as down to between 0 and 90 degrees relative to vertical. This manipulation also serves to urge the inclusions away from the necks 33 of the containers 34. As illustrated in FIG. 3, the conveyor belt 32 then proceeds through several further inversions, including holding the containers 34 at an inversion angle between 90 and 180 degrees relative to vertical for two more times. Typically, an apparatus according to some embodiments of the disclosure is configured to provide an inversion sequence comprising at least eight inversions, wherein each inversion comprises crossing the 90 degree line relative to vertical (i.e., perpendicular to vertical). In certain embodiments, the apparatus resembles a roller coaster, wherein the containers are analogous to passengers and the conveyor is analogous to the roller coaster cars.

Figure 4:
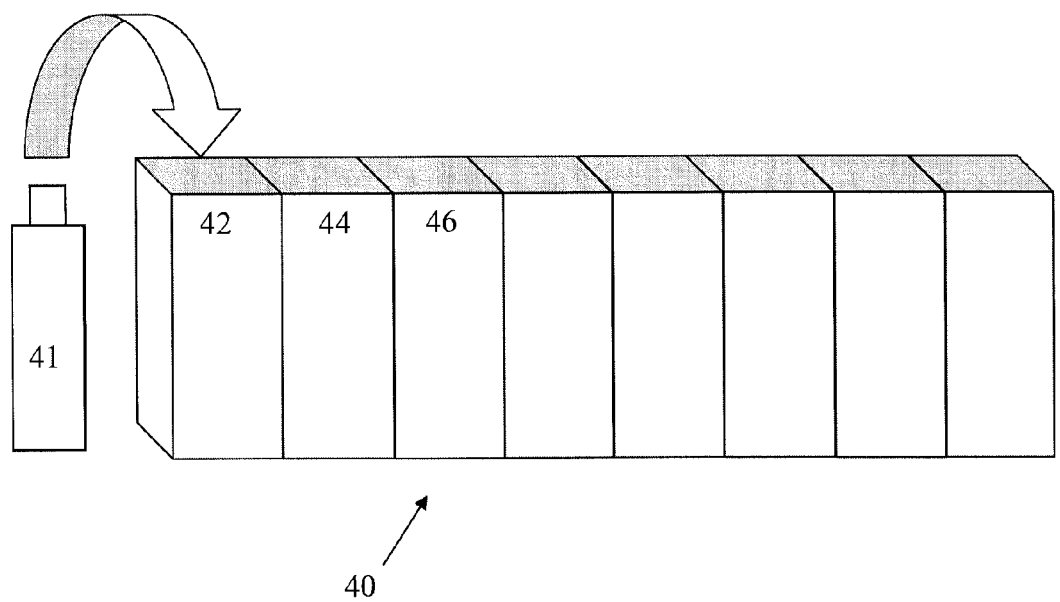
FIG. 4 illustrates a perspective view of a portion of a conveyor comprising pockets for containers.

A portion of a conveyor is illustrated in FIG. 4. Conveyor 40 comprises a plurality of pockets 42, 44, 46, etc., wherein each of the plurality of pockets is configured to contain one or more containers 41. Including pockets in the conveyor allows the containers to be isolated from each other and/or to assist in stabilizing the containers within the conveyor upon subjection to inversion during sterilization of the containers.

In certain embodiments, an enclosure is disposed above the conveyor for preventing the plurality of containers from falling off the conveyor. In one aspect, the enclosure comprises a lid for the conveyor, such that gravity does not cause the containers to fall out or off of the conveyor when the containers are inverted to an angle of 90 degrees or greater relative to vertical. Optionally, the lid comprises a metal plate. In certain embodiments, the apparatus comprises insulation disposed around at least a portion of the conveyor and the enclosure, to assist in maintaining the temperature of the liquid in the containers during the manipulation. For example, the insulation may be disposed around the conveyor and the enclosure over the entire length of the apparatus, or over a portion of the length of the apparatus.

The conveyor is configured to subject the plurality of containers to one or more inversion sequences comprising a first inversion of the container until the base is located at an angle of up to 180 degrees relative to vertical, wherein the first inversion occurs over a time period of at least three seconds, and wherein the inversion sequence prevents any inclusions from agglomerating in the plurality of containers and allows the liquid to sterilize the plurality of containers.

Figure 5:
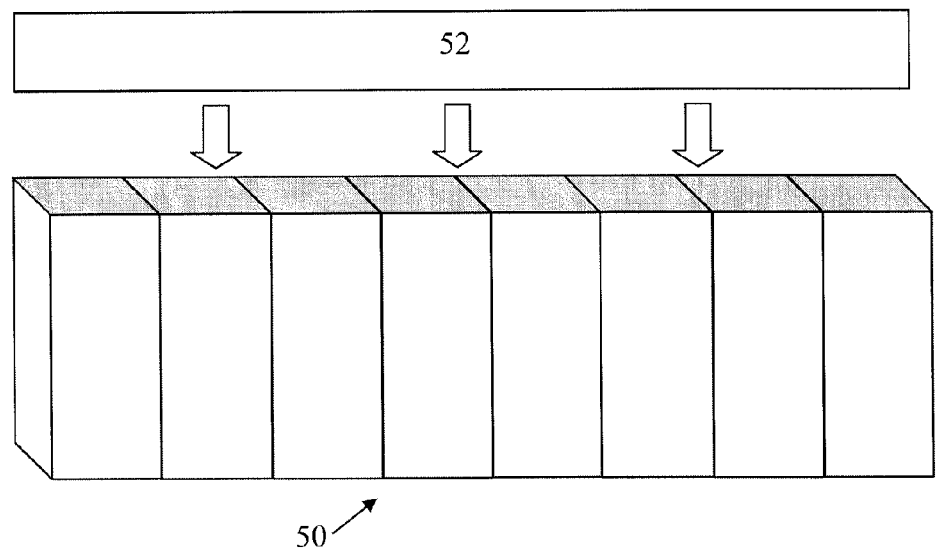
FIG. 5 illustrates the portion of a conveyor of FIG. 4 and a top view of an enclosure according to an embodiment.

Referring to FIG. 5, an enclosure 52 is disposed above conveyor 50 for preventing the plurality of containers from falling off the conveyor, such as when the containers are subjected to inversion angles. In particular, enclosure 52 of FIG. 5 comprises a lid configured to be affixed on top of conveyor 50. Accordingly, when enclosure 52 is employed with conveyor 50, any containers disposed within conveyor 50 will be protected from being tipped out of conveyor 50 when the containers are positioned at angles greater than 90 degrees with respect to vertical. The main characteristic of the enclosure according to embodiments of the disclosure is that it will hold each container sufficiently tightly in place so that it does not fall off the conveyor or shift during the inversion process.

Figure 6:
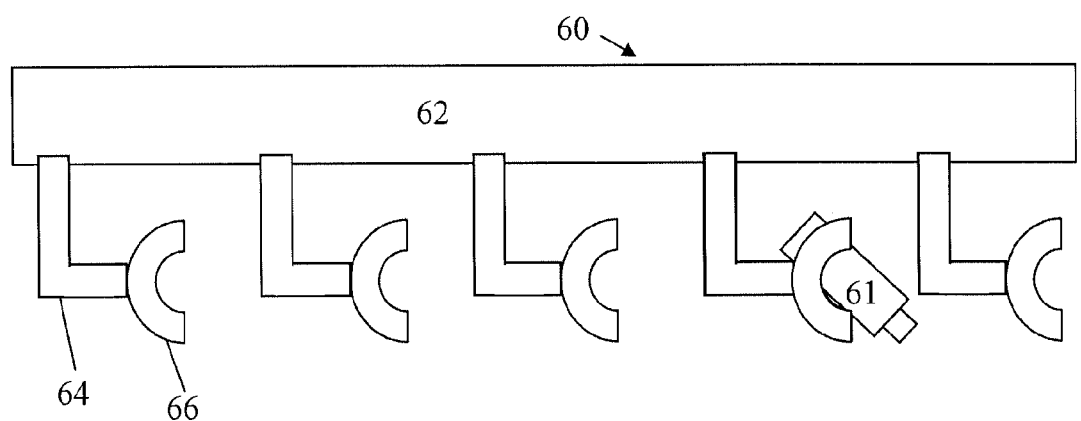
FIG. 6 illustrates a side view of an apparatus for manipulating containers according to another embodiment of the disclosure.

Referring to FIG. 6, an alternate apparatus 60 is provided for manipulating containers. In selected embodiments, apparatus 60 comprises a housing 62 and a plurality of arms 64 disposed on housing 62 and extending therefrom perpendicular to housing 62. Further, apparatus 60 comprises a plurality of clamps 66, and each clamp 66 is configured to be attached to the distal end of one of the arms 64 of the apparatus 60. One container 61 then is held within one clamp 66. The apparatus 60 manipulates containers 61 by causing the plurality of clamps 66 to rotate, thereby inverting the plurality of containers 61. The apparatus 60 may comprise a motor (not shown) configured to drive the plurality of clamps 66 through one or more complete inversion sequences as described above to carry out the sterilization of the containers 61.

EXAMPLES

Example 1

A juice beverage containing mandarin orange sacs was prepared, comprising the ingredients listed in Table 1.

TABLE 1

| Ingredient | Metric Volume | Metric Weight |
|---|---|---|
| Citric Acid Anhydrous | | 7.154 KG |
| Ascorbic Acid | | 1.021 KG |
| Beta Carotene 10% CWS | | 0.229 KG |
| Vitamin Premix (A&E) | | 0.680 KG |
| H D Orange Juice 17M14HDO | 57.020 LT | 74.950 KG |
| Orange Flavor | 3.8 LT | 3.987 KG |
| Xanthan Gum Keltrol | | 1.533 KG |
| Whole Orange Pulp Sacs | 201.700 LT | 209.200 KG |
| Sucrose Granulated | | 345.900 KG |
| Treated Water (Calculated) | 2,924.000 LT | 2,916.000 KG |
| Finished Beverage Yield | 3,406.0 LT (i.e., 900 gallons) | 3,560.8 KG |

Nine hundred gallons of the beverage was heated to an average temperature of 85° C. (185° F.) using a thermal process, i.e., a heater, and held at that temperature for 30 seconds. Next, the hot beverage was filled into 420 mL PET bottles and capped. Prior to cooling, the bottles are placed on an apparatus and subjected to three inversion sequences. Each inversion sequence comprises the inverting the containers to the angles plotted in the graph of FIG. 1. Each inversion sequence is performed over a time period of 36.7 seconds, for a total of 110.1 seconds for the three inversion sequences. The sterilization method was tested by taking temperature measurements on the inside of the bottle caps, as well as performing a micro incubation study on 30,000 bottles of product. The micro incubation analysis of the bottles showed achievement of sterility of 100% of the bottles.

Comparative Example 2

A juice beverage containing mandarin orange sacs was prepared and filled into 420 mL PET bottles according to the method disclosed in Example 1. Prior to cooling, the hot-filled bottles were subjected to a camel hump inversion process for six seconds. The camel hump inversion method involved grabbing a vertical upright bottle by rubber grippers and tilting the bottle until it was tipped 90 degrees on its side. The bottle was transferred to an upright position when it reached the top, and then was tilted 90 degrees on its side in the opposite direction. A micro incubation analysis of the bottles exhibited sterility failure of 10% of the bottles.

While Example 1 involved a heating of product prior to filling containers using a thermal process, i.e., heating with a heater, in accordance with embodiments of the present disclosure, the product can be filled into 420 mL PET bottles, and the temperature of the product can be raised by irradiating the product with non-ionizing electromagnetic radiation from a non-ionizing electromagnetic radiation device for about 30 seconds to bring the average temperature of the product to about 85° C. (185° F.). In an embodiment, the bottles can be capped after being filled with product and prior to the irradiating of the product. Those skilled in the art will recognize that in accordance with this disclosure, higher temperatures and/or greater length of time at an elevated temperature may be required to achieve commercial sterilization for a product having a pH that is higher than a product having a lower pH. For example, a product having a pH above 3.8 may need to be irradiated with non-ionizing electromagnetic radiation in a manner to raise the temperature of the product to higher elevated temperature and/or maintain the product at an elevated temperature for a longer period of time than for a product having a pH below 3.8 to achieve commercial sterilization.

The method may comprise providing a closed container, the closed container comprising a free-flowing product disposed within the closed container; conveying the closed container through a non-ionizing electromagnetic radiation device during a conveying time period, transmitting non-ionizing electromagnetic radiation from the non-ionizing electromagnetic radiation device to the free-flowing product to achieve a sterilization temperature during a transmitting time period, at least a portion of the transmitting time period overlapping with a least a portion of the conveying time period, and manipulating the closed container during a manipulating time period to achieve sterilization of the entirety of the product within the closed container and the entirety of interior surfaces of the closed container, at least a portion of the manipulating time period overlapping with at least a portion of the transmitting time period. In an embodiment of the disclosure, at least a portion of the manipulating time period may overlap with at least a portion of the conveying time period. In an1 embodiment, at least a portion of the manipulating time period, at least a portion of the transmitting time period, and at least a portion of the conveying time period overlap. In an embodiment, the transmitting comprises non-ionizing electromagnetic radiation selected from the group consisting of microwave radiation and radio frequency radiation. In an embodiment, the non-ionizing electromagnetic radiation has a frequency selected from the group consisting of 3 KHz<f<1 MHz, 1 MHz≤f<300 MHz, and 300 MHz and 300 GHz.

In an embodiment, the transmitting time period occurs in less than about three minutes. In an embodiment, the conveying time period, the transmitting time period, and the manipulating time period take place over a collective time period, the collective time period being less than about three minutes.

In an embodiment, the manipulating comprises manipulating the closed container to allow free-flowing product to contact the interior surfaces of the closed container.

In an embodiment, the manipulating comprises subjecting the closed container to an inversion sequence, the inversion sequence comprising a first inversion of the closed container until a base of the closed container is located at an angle of up to 180 degrees relative to vertical, wherein the first inversion occurs over a time period of at least three seconds. In an embodiment, the first inversion inverts the closed container until the base of the closed container is located at an angle of up to 135 degrees relative to vertical.

In an embodiment, the free-flowing product comprises a food, e.g., a beverage. In an embodiment, the free-flowing product comprises at least one aqueous liquid. In an embodiment, the free-flowing product comprises a carbonated beverage. In an embodiment, the free-flowing product comprises a non-carbonated beverage. In an embodiment, the free-flowing product comprises a liquid selected from the group consisting of a water, a near water, a sports drink, a juice, a non-alcoholic beverage, an alcoholic beverage (e.g., a beer), a spritzer, and a tonic.

In an embodiment, the inversion sequence further comprises a second inversion of the closed container back to an angle of about 60 degrees relative to vertical. The second inversion may occur over a time period of about two seconds.

In an embodiment, the inversion sequence comprises a third inversion of the closed container between an angle of about 60 degrees from vertical and an angle of about 135 degrees from vertical. The third inversion may occur over a time period of about two seconds.

In an embodiment, the inversion sequence comprises at least eight inversions and occurs over an inversion time period of at least thirty seconds.

In an embodiment, the method may comprise comprising subjecting the closed container to the inversion sequence at least two times.

In an embodiment, the first inversion comprises holding the closed container at an angle of about 135 degrees relative to vertical for at least about three seconds.

In an embodiment of the disclosure, an apparatus is provided for sterilizing containers. The apparatus may comprise a conveyor configured to convey a plurality of closed containers for a conveying time period, the plurality of containers comprising free-flowing product disposed within the closed containers, and a non-ionizing electromagnetic radiation device configured to transmit non-ionizing electromagnetic radiation to the free-flowing product to achieve a sterilization temperature during a transmitting time period. The conveyor may be configured to convey the plurality of closed containers through the non-ionizing electromagnetic radiation device during a conveying time period, at least a portion of the conveying time period overlapping with at least a portion of the transmitting time period. At least a portion of the conveyor may be configured to manipulate the plurality of closed containers during a manipulating time period to achieve sterilization of the entirety of the product within each of the plurality of the closed containers and the entirety of interior surfaces of each of the plurality of the closed containers, at least a portion of the manipulating time period overlapping with at least a portion of the transmitting time period.

In an embodiment, at least a portion of the manipulating time period overlaps with a least a portion of the conveying time period. In an embodiment, at least a portion of the manipulating time period, at least a portion of the transmitting time period, and at least a portion of the conveying time period overlap.

In an embodiment, the non-ionizing electromagnetic radiation device is configured to transmit non-ionizing electromagnetic radiation to the free-flowing product selected from the group consisting of microwave radiation and radio frequency radiation. In an embodiment, the non-ionizing electromagnetic radiation device transmits non-ionizing electromagnetic radiation having a frequency selected from the group consisting of 3 KHz<f<1 MHz, 1 MHz≤f<300 MHz, and 300 MHz and 300 GHz.

In an embodiment, the transmitting time period occurs in less than about three minutes. In an embodiment, the conveying time period, the transmitting time period, and the manipulating time period take place over a collective time period, the collective time period being less than about three minutes.

In an embodiment, the conveyor is configured to manipulate the plurality of closed containers to allow free-flowing product to contact the interior surfaces of the plurality of closed containers.

In an embodiment, each of the plurality of closed containers comprises a respective base, the conveyor configured to manipulate each of the plurality of closed containers to one or more inversion sequences comprising a first inversion of each of the plurality of the closed containers until the respective base of the closed container is located at an angle of up to 180 degrees relative to vertical, wherein the first inversion occurs over a time period of at least three seconds.

In an embodiment, the one or more inversion sequences each comprise inverting each of the plurality of closed containers until the respective base of the closed container is located between an angle of about 60 degrees relative to vertical and an angle of about 135 degrees relative to vertical, and wherein the one or more inversion sequences, and wherein the one or more inversion sequences each occur over a time period of at least 30 seconds.

In an embodiment, the closed container containing a free-flowing material comprises a gas bubble, which may also be called a pocket of gas. The gas may be air. Those skilled in the art will recognize that a gas bubble in the container will allow for increased mixing of material in the container as the container is manipulated. Gas bubble volume for optimal mixing is related to the size of the container and the volume of material in the container. Thus, as the size of the container and/or the volume of material in the container increases, gas bubble volume may be increased to improve mixing as the container is manipulated, assuming the same manipulation to the container.

In an embodiment, the one or more inversion sequences each comprise holding the plurality of closed containers at one or more angles for at least half of a second each.

In an embodiment, the conveyor is configured to convey bottles comprising a volume selected from the group consisting of 240 mL, 355 mL, 420 mL, and 1000 mL.

In an embodiment, a method for sterilization of the interior of a container is provided, the method comprising placing a container vertically upright on a base of the container, the container containing a free-flowing product. The container is subjected to non-ionizing electromagnetic radiation sufficient to achieve commercial sterilization temperature within about 30 seconds. The container is subjected to an inversion sequence, the inversion sequence comprising a first inversion of the container until the base is located at an angle of up to 180 degrees relative to vertical, wherein the first inversion occurs over a time period of at least three seconds, and wherein the inversion sequence allows for sterilizing of interior surfaces of the container. In an embodiment, the container is held at the angle of up to 140 degrees relative to vertical for at least three seconds.

In an embodiment, the inversion sequence comprises inverting the container between an angle of about 60 degrees relative to vertical and an angle of about 135 degrees from vertical, and wherein the inversion sequence occurs over a time period of at least 30 seconds.

Example 3

An orange beverage was prepared, comprising the ingredients listed in Table 2. The pH of the orange beverage was less than 3.8

TABLE 2

| Description | Brix Aim | Acid Aim | Amount | UM | Liters | % by weight |
|---|---|---|---|---|---|---|
| Orange Concentrate Low oil - Brazilian | 66.0 | 3.57 | 187.57 | KG | 141.939 | 18.7570 |
| Orange Flavor, Natural | 70.0 | None | 0.07 | KG | 0.091 | 0.0078 |
| Ascorbic Acid USP FCC Kosher | 100.0 | 36.40 | 0.04 | KG | 0.067 | 0.0049 |

TABLE 2-continued

| Description | Brix Aim | Acid Aim | Amount | UM | Liters | % by weight |
|---|---|---|---|---|---|---|
| Antifoam Calgene | None | None | 0.01 | KG | 0.010 | 0.0010 |
| Water Filtered | None | None | 812.29 | KG | 814.556 | 81.2293 |

Figure 7A:
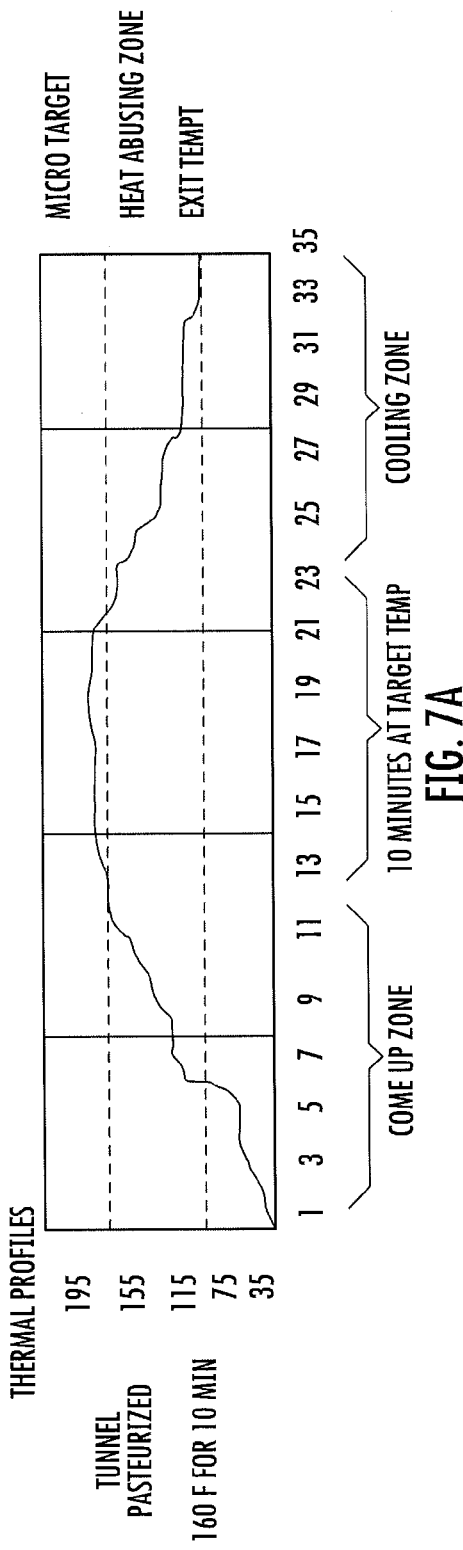
FIG. 7a depicts the temperature profile of a carbonated high acid product when subjected to conventional tunnel pasteurization.

FIG. 7a depicts the temperature profile of a carbonated high acid product having a pH of less than 3.8 as identified in Table 2 when subjected to conventional tunnel pasteurization, i.e., the product is placed in a bottle, the bottle is capped, the bottle is sent through a tunnel pasteurization apparatus where it is heated by hot water sprayed onto the bottle, and is then allowed to cool. In this example, the product was heated in a "come up" zone, i.e., about 13 minutes, until it reached about 160° F. The product was then maintained at a target temperature of about 160° F. for about 10 minutes to ensure sterilization of the product and the interior surfaces of the container. The product and the bottle were then allowed to cool.

Example 4

Figure 7B:
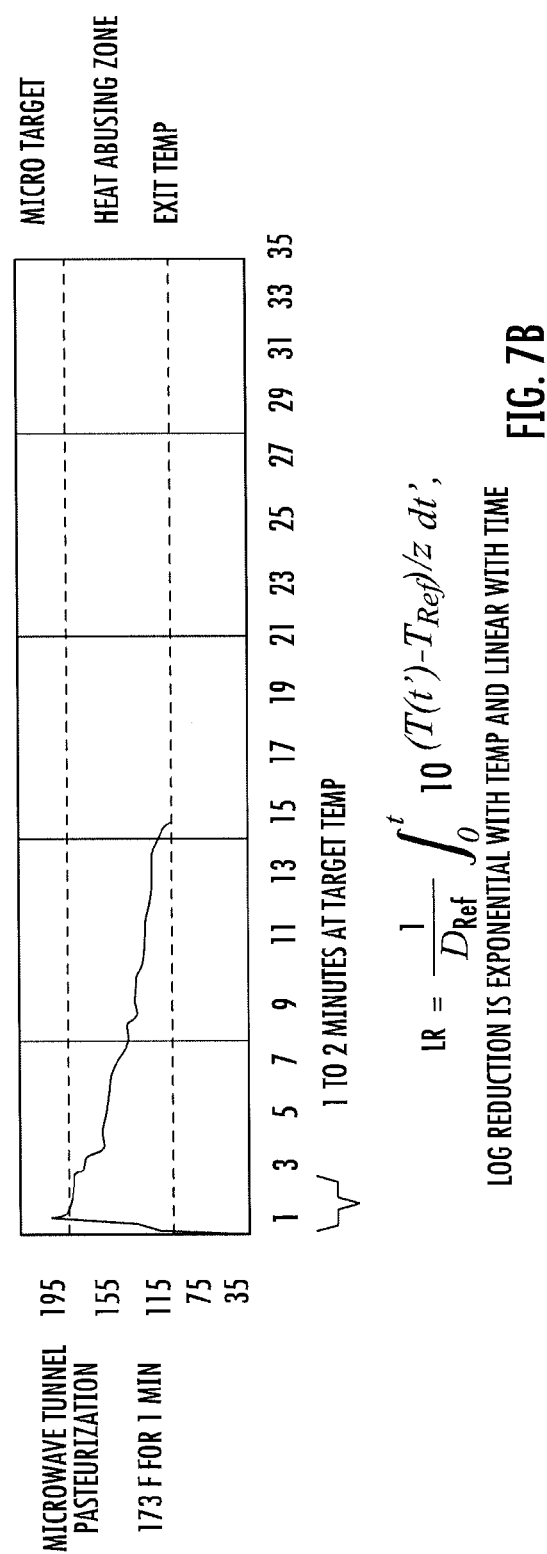
FIG. 7b depicts the temperature profile of a carbonated high acid product when subjected to microwave radiation after being placed in a bottle and the bottle capped.

FIG. 7b depicts the temperature profile of the same carbonated high acid product as in Example 3, only this time the product is subjected to microwave radiation after being placed in a bottle and the bottle capped. In this example, the "come up" zone to raise the temperature to 173° F. using microwave radiation was about 60 seconds, and the product was maintained at a target temperature of about 172.5° F. for about 1 minute. The product and the bottle were then allowed to cool.

The log reduction (LR) in pathogens is exponential with temperature and linear with time. The log reduction may be expressed as follows:

$$LR = \frac{1}{D_{Ref}} \int_0^t 10^{(T(t')-T_{Ref})/z} dt',$$

where $D_{Ref}$ is the time required for a one decimal reduction in the pathogen at the reference temperature $T_{Ref}$, the z-value is the temperature increment needed for a ten-fold decrease in D, T(t') is temperature at time t, t is time, dt' is the instantaneous change in time, D and Z are microbiological parameters for specific organisms, and $T_{Ref}$ is the temperature that starts microorganism death.

A comparison of FIGS. 7a and 7b shows that the time of the "come up" zone, and the time of maintaining the product at the target temperature is much longer with conventional tunnel pasteurization, i.e., which thermally heats product by spraying hot water onto a bottle filled with the product, than a technique that heats product with microwave radiation. The comparison of temperature profiles also shows that the time the product is in a heat abusing zone (i.e., a zone wherein the temperature may result in degradation of organoleptic properties of the product) is much longer in Example 3 than in Example 4.

Example 5

Carbonated water having a beginning temperature of about 67° F., plus or minus 1° F., was filled into bottles and then capped. After being capped, the bottles were sent in the upright position through apparatus depicted in FIGS. 8-10.

While being sent through this apparatus, the bottles were subjected to microwave radiation for a time of about 1 minute. The microwave radiation emitted was 50 Kilowatt 1½ RP. After being sent through the apparatus for this first pass of microwave radiation, the caps were taken off of bottles, and the temperature of the carbonated water measured at the top, center, and bottom of the bottles. The bottles were then capped and then agitated, i.e., turned upside down for about 3 seconds, and then turned right side up. The caps were then taken off of the bottles, and the temperature of the carbonated water was then measured at the center of each bottle. Tables 3A, 3B, and 3C show the temperature readings for bottles numbered 1 through 24 at the top, center, and bottom of the bottles. As shown in Tables 3A, 3B, and 3C, the temperature of the carbonated water at the center of the bottles ranged from 168 to 155° F. after being subjected to microwave radiation as described above and prior to being agitated. The temperature of the carbonated water at the center of the bottles ranged from 157 to 151° F. after being subjected to microwave radiation and after being agitated as described above. Thus, with agitation as described above, the center temperature range varied by 6° F. versus 13° F. without agitation. It will be recognized by those skilled in the art, that agitation during irradiation, such as gradually turning the bottles upside down and then right side up during irradiation will result in a center temperature range of being less than and/or no more than 6° F.

TABLE 3A

Temperatures in ° F. for bottles numbered 1 through 8

|  | 1 | 2 | 3 | 4 | 5 | 6 | 7 | 8 |
|---|---|---|---|---|---|---|---|---|
| Top | 165 | 168 | 168 | 168 | 167 | 172 | 167 | 164 |
| Center Pre-agitation | 163 | 165 | 163 | 165 | 166 | 168 | 163 | 162 |
| Bottom | 152 | 153 | 150 | 155 | 155 | 152 | 151 | 150 |
| Center post-agitation | 153 | 154 | 152 | 155 | 156 | 157 | 155 | 152 |

TABLE 3B

Temperatures in ° F. for bottles numbered 9 through 16

|  | 9 | 10 | 11 | 12 | 13 | 14 | 15 | 16 |
|---|---|---|---|---|---|---|---|---|
| Top | 172 | 165 | 163 | 168 | 158 | 163 | 164 | 163 |
| Center Pre-agitation | 167 | 161 | 160 | 163 | 155 | 160 | 160 | 163 |
| Bottom | 152 | 152 | 149 | 152 | 151 | 150 | 146 | 149 |
| Center post-agitation | 157 | 153 | 151 | 155 | 151 | 150 | 154 | 157 |

TABLE 3C

Temperatures in ° F. for bottles numbered 17 through 24

|  | 17 | 18 | 19 | 20 | 21 | 22 | 23 | 24 |
|---|---|---|---|---|---|---|---|---|
| Top | 161 | 162 | 159 | 163 | 158 | 166 | 163 | 164 |
| Center Pre-agitation | 159 | 158 | 157 | 161 | 156 | 161 | 158 | 160 |
| Bottom | 149 | 147 | 149 | 146 | 143 | 149 | 146 | 148 |
| Center post-agitation | 155 | 154 | 154 | 157 | 154 | 156 | 154 | 156 |

Figure 8:
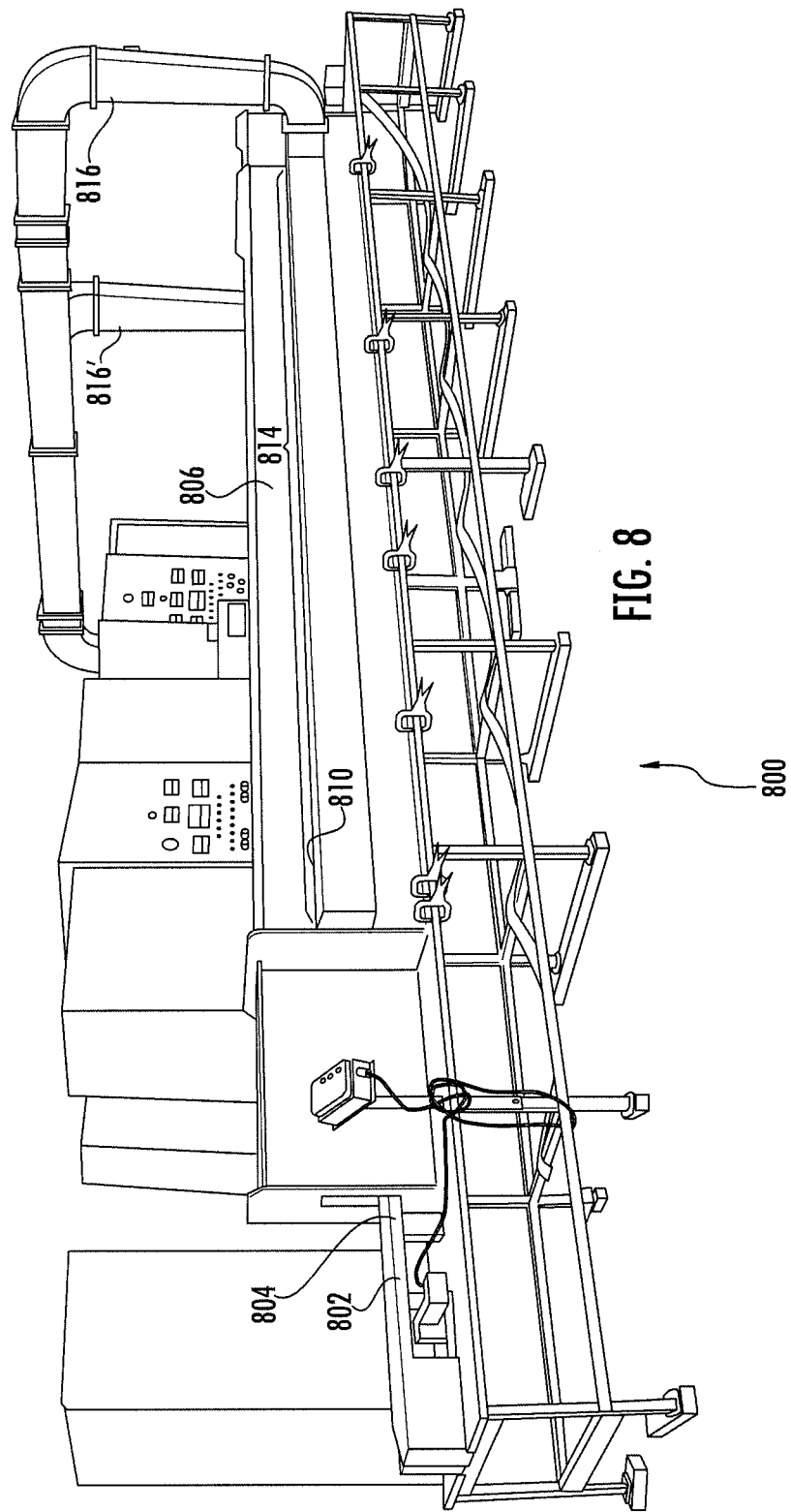
FIG. 8 illustrates a perspective view of an apparatus according to an embodiment of the disclosure.
Figure 9:
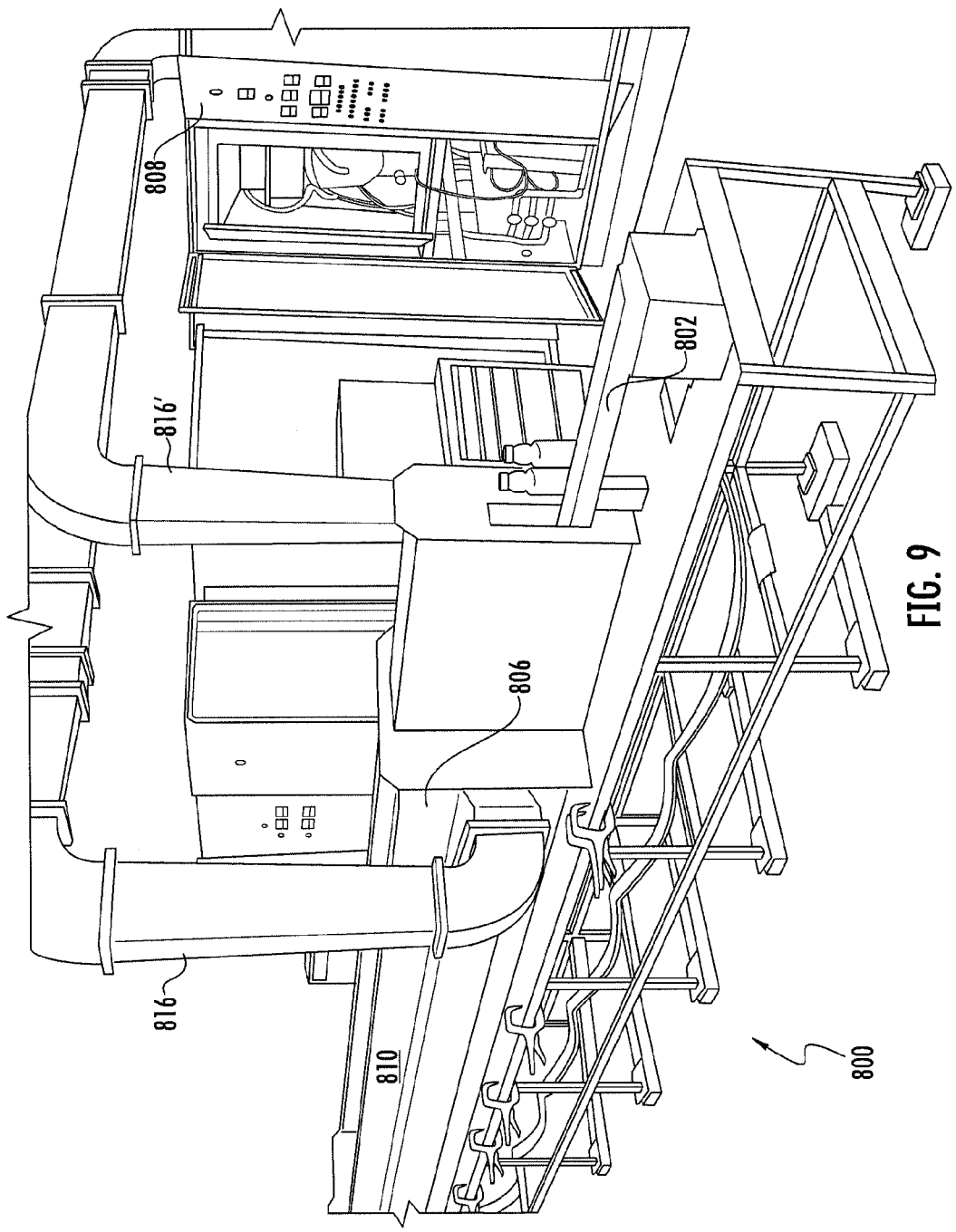
FIG. 9 illustrates the apparatus of FIG. 8, taken from a different perspective view than the perspective view shown in FIG. 8.
Figure 10:
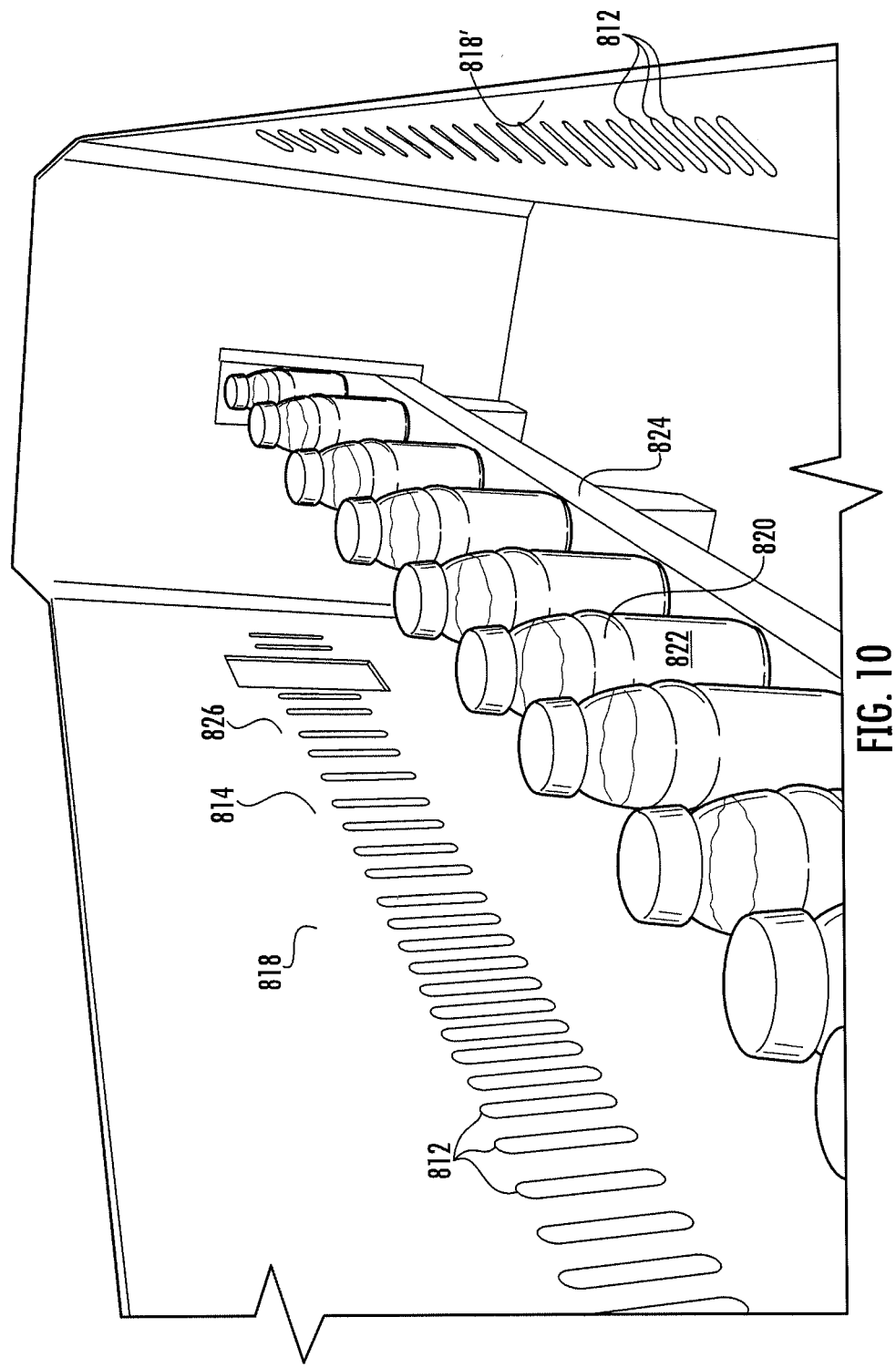
FIG. 10 shows a perspective view of a portion of a conveyor and portion of a non-ionizing electromagnetic radiation device useful in certain embodiments of the disclosure.

FIGS. 8-10 illustrate views of an apparatus according to an embodiment of the disclosure. Apparatus 800 comprises a conveyor 802 configured to convey a plurality of closed containers for a conveying time period, the plurality of containers comprising free-flowing product disposed within the closed containers. Conveyor 802 may comprise a first portion 804 wherein closed containers are placed in a vertical position prior to being conveyed through a non-ionizing electromagnetic radiation device 806 (e.g. a microwave). Device 806 may comprise a non-ionizing electromagnetic radiation wave generator 808, an elongated enclosure or tunnel 810, a plurality of openings 812 spaced along a section 814 of tunnel 810, and at least one duct 816. In a preferred embodiment, at least two ducts (816 and 816') are provided to deliver radiation from two oppositely facing sides 818 and 818' of section 814 and into tunnel 810. Ducts 816 and 816' are configured to deliver radiation generated by the generator 808 through openings 812 and to product in closed containers being conveyed by conveyor 802 through tunnel 810.

FIG. 10 shows a perspective of an embodiment of the disclosure, with the top tunnel 810 removed for the purpose of illustration. As shown in FIG. 10, capped bottles 820 filled with product 822 are conveyed by a second portion 824 of conveyor 802 through a first subsection 826 of section 814.

Figure 11:
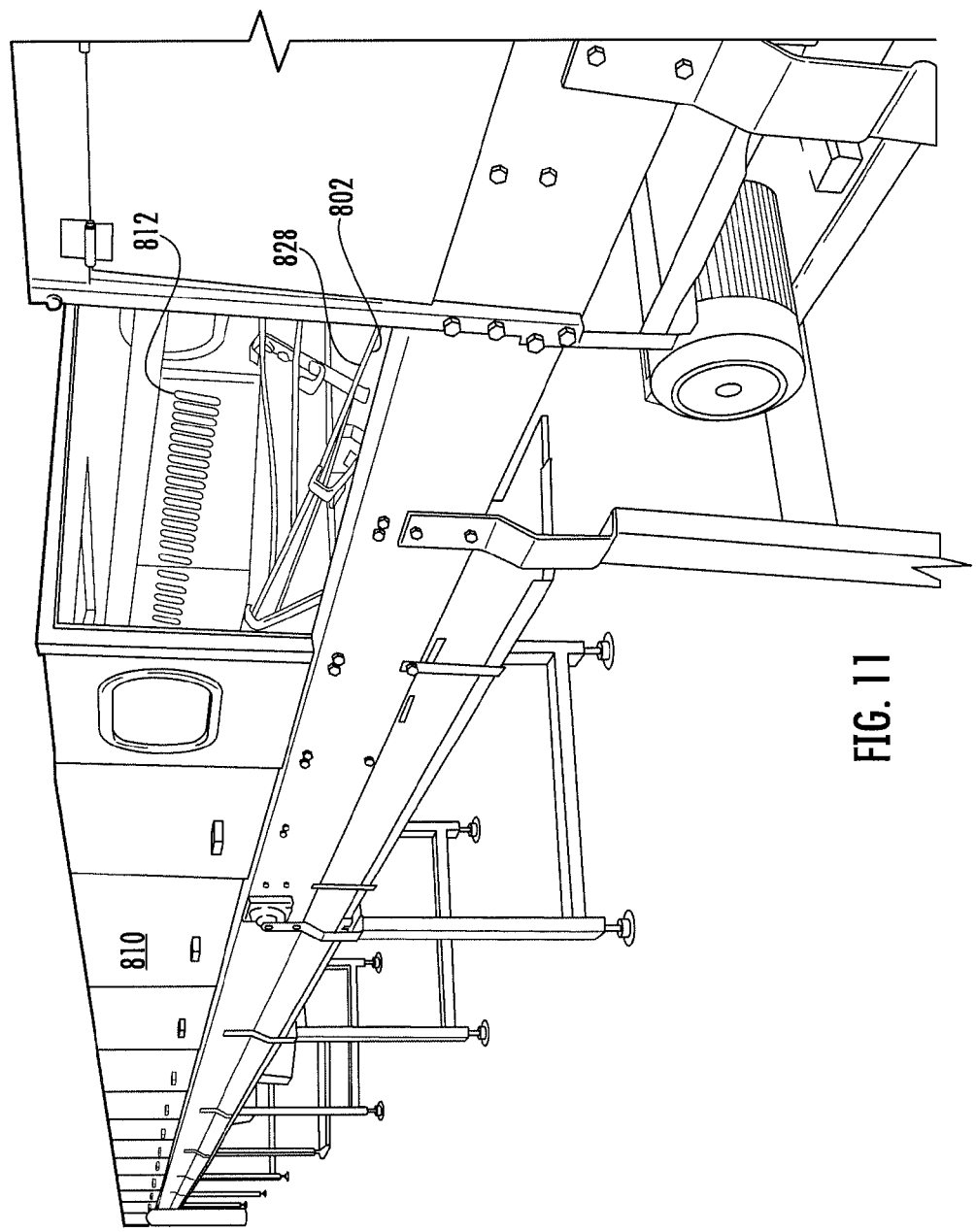
FIG. 11 shows a perspective view of a conveyor useful in certain embodiments of the disclosure.

FIG. 11 shows a perspective of tunnel 810 with a panel of tunnel 810 removed. As shown in FIG. 11, conveyor 802 comprises a third portion 828 for manipulating containers or bottles 820. Third portion 828 provides suitable manipulation useful in certain embodiments of the disclosure. Third portion 828 may comprise a conveyor 30 or section(s) of conveyor 30 shown in FIG. 3.

Figure 12:
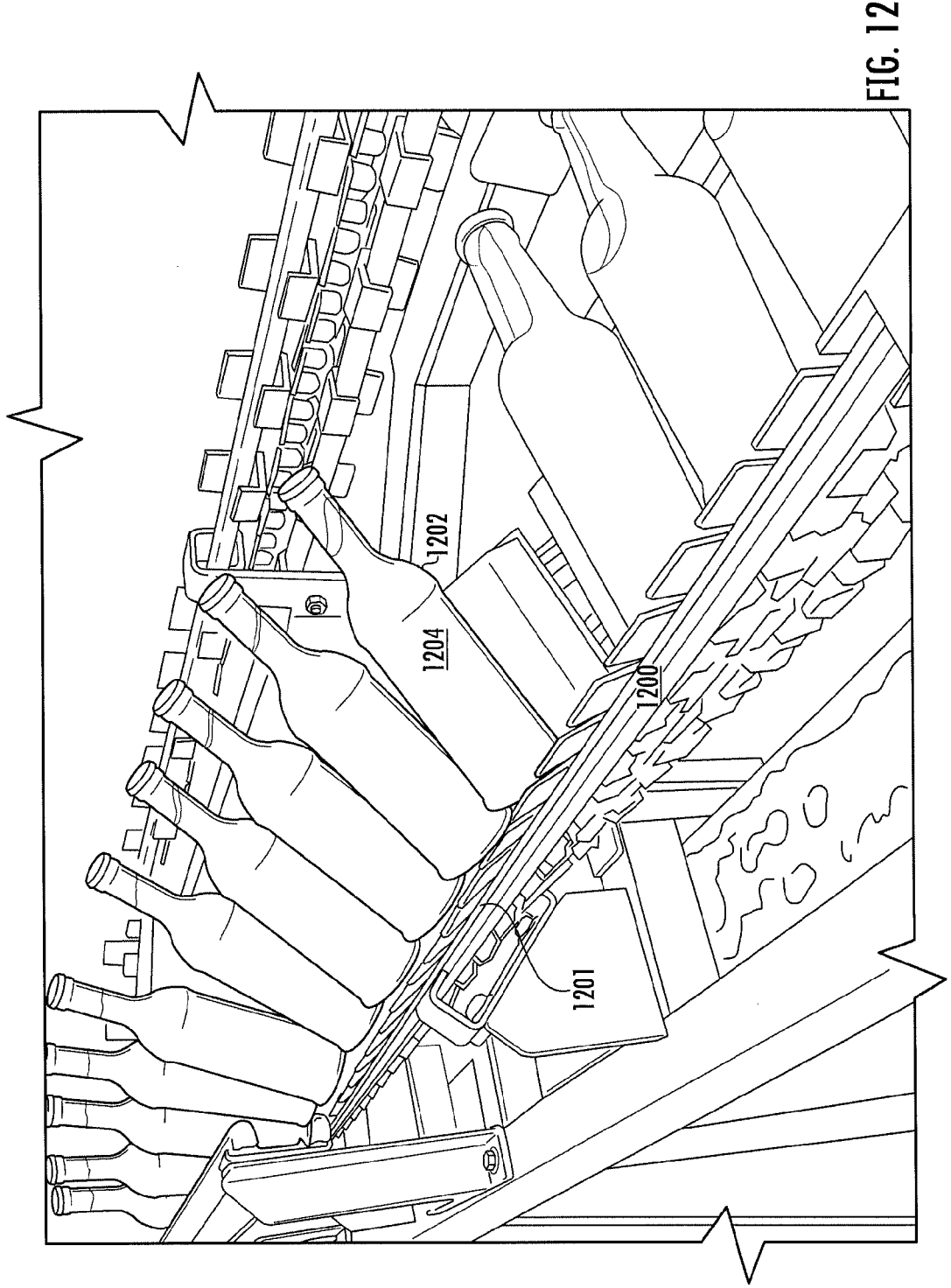
FIG. 12 shows a perspective of a portion of conveyor useful in certain embodiments of the disclosure.

FIG. 12 shows a perspective of a portion 1201 of conveyor 1200 useful in certain embodiments of the disclosure. In FIG. 11, capped bottles 1202 contain a juice 1204. Juice 1204 may contain inclusions, e.g., mandarin orange sacs. As shown in FIG. 12, capped bottles 1202 are manipulated by conveyor 1200 from a vertical position to a non-vertical position as the capped bottles 1202 are conveyed in a longitudinal direction along conveyor 1200. Conveyor 1200 may comprise a conveyor 30 or section(s) of conveyor 30 shown in FIG. 3, or a third portion 828 shown in FIG. 11.

Those skilled in the art will recognize that the methods disclosed herein may be adjusted as may be appropriate to achieve commercial sterilization. By way of example, but not limitation, a method to achieve commercial sterilization may comprise subjecting closed containers comprising carbonated orange juice with non-ionizing electromagnetic radiation to bring the temperature of the juice to at least about 172.5 degrees Fahrenheit, and manipulating the containers in manner that allows the juice to mix and contact the interior surfaces of the containers. In a preferred embodiment, the closed containers comprise a gas bubble, which will facilitate mixing of the juice and juice contact with the interior surfaces of the containers.

In an embodiment, carbonated orange juice having a pH of 3.6 may be placed in PET bottles and then capped so that there is a gas bubble above the juice in each bottle. The capped bottles may then be subjected to a non-ionizing electromagnetic radiation to raise the temperature of the juice to 172.5 degrees Fahrenheit and maintain the juice at that elevated temperature for about 1 minute, and during this period of time, the bottles may be subjected to one or more inversions in accordance with the angles plotted in the graph of FIG. 1 to achieve commercial sterilization.

In an embodiment, carbonated orange juice having a pH of 3.6 may be placed in PET bottles and then capped so that there is a gas bubble above the juice in each bottle. The capped bottles may then be subjected to a non-ionizing electromagnetic radiation to raise the temperature of the juice to about 168-169 degrees Fahrenheit and maintain the juice at that elevated temperature for about 2 minutes, and during this period of time, the bottles may be subjected to one or more inversions in accordance with the angles plotted in the graph of FIG. 1 to achieve commercial sterilization. In accordance with this disclosure, shorter times for commercial sterilization may be achieved if the "come up" temperature of the beverage is raised to greater than about 168-169 degrees Fahrenheit. For example, in an embodiment, capped bottles may be subjected to a non-ionizing electromagnetic radiation to raise the temperature of the juice to about 172.5 degrees Fahrenheit and maintain the juice at that elevated temperature for about 1 minute, and during this period of time, the bottles may be subjected to one or more inversions in accordance with the angles plotted in the graph of FIG. 1 to achieve commercial sterilization.

The above periods of time in accordance with the present disclosure are much shorter than a conventional tunnel pasteurization process. Conventional tunnel pasteurization typically takes at least about 10 minutes to heat containers and product with a spray of hot water to raise the temperature of the containers and product to about 160-165 degrees, and about another 10 minutes to maintain the containers and product at that elevated temperature to achieve commercial sterilization.

Those skilled in the art will recognize that in accordance with this disclosure, any suitable manipulation of containers can be used that will result in sterilization of entirety of product and sterilization of the entirety of interior surfaces of containers containing product.

Benefits of embodiments of the disclosure include the enabling of innovation and manufacture beverages having shelf-life of at least three months and do not contain preservatives that would otherwise have been necessary using conventional techniques to achieve the same shelf-life. Benefits also include the providing of a way to easily and cost-effectively convert or retrofit existing manufacturing lines using conventional hot-fill techniques or conventional tunnel pasteurization techniques to achieve more efficient sterilization of product and containers, and reducing the carbon footprint and/or the space footprint required by conventional techniques. Benefits include at least parity or an improved thermal or temperature profile than conventional hot-fill sterilization techniques, and substantially improved thermal or temperature profile than conventional tunnel pasteurization techniques. Benefits include ability to achieve sterilization of products having inclusions and containers that contain products having inclusions. Benefits of embodiments of the disclosure include minimizing product and container abuse, improving PET tunnel pasteurization, providing shorter time for manufacture, providing products packaged in containers and that have a clean preservative label, providing more efficient heating than conventional thermal heating (such as spraying hot water onto capped bottles), and providing opportunity to manufacture and package products that could not be manufactured and packaged using conventional techniques. Benefits include providing opportunity to use containers that could not be used using conventional techniques. Benefits include providing improved manufacture and bottling for a wide variety of beverages, particularly when PET bottling used. Benefits include the ability to use electricity, which may be generated by sustainable and/or non-fuel burning generators, as opposed to fuel burning generators used in certain conventional techniques.

As previously noted, conventional tunnel sterilization has an energy efficiency of about 30-50%, i.e., about 30-50% of the amount of energy (which may be expressed in British Thermal Units, i.e., BTU) generated by a fuel-burning boiler is actually delivered into the product. Benefits of the present disclosure include sterilization having a greater energy efficiency of 70%, i.e., up to about 70% of the amount of energy generated to provide non-ionizing electromagnetic radiation is delivered into the product.

While the disclosure has been described with respect to specific examples including presently preferred modes of carrying out the disclosure, those skilled in the art will appreciate that there are numerous variations and permutations of the above described methods and structures that fall within the spirit and scope of the disclosure. It should be understood that the disclosure is not limited in its application to the details of construction and arrangements of the components set forth herein. Variations and modifications of the foregoing are within the scope of the present disclosure. It is also being understood that the disclosure disclosed and defined herein extends to all alternative combinations of two or more of the individual features mentioned or evident from the text. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art. In particular, it is contemplated to use embodiments of the disclosures for sterilization of the free-flowing product, such as juices, clear broth and soup having inclusions. It is therefore contemplated that such modifications can be made without departing from the spirit or scope of the present disclosure as defined in the appended claims.

The invention claimed is:

1. A method for sterilization comprising:
   providing a closed container, the closed container comprising a free-flowing product disposed within the closed container;
   conveying the closed container through a non-ionizing electromagnetic radiation apparatus during a conveying time period,
   transmitting non-ionizing electromagnetic radiation from the apparatus to the free-flowing product to achieve a sterilization temperature during a transmitting time period, at least a portion of the transmitting time period overlapping with at least a portion of the conveying time period, and
   manipulating the closed container during a manipulating time period to achieve sterilization of the entirety of the product within the closed container and the entirety of interior surfaces of the closed container, at least a portion of the manipulating time period overlapping with at least a portion of the transmitting time period, the manipulating comprising subjecting the closed container to an inversion sequence, the inversion sequence comprising a first inversion of the closed container until a base of the closed container is located at an angle of up to 180 degrees relative to vertical, and a second inversion of the closed container, in the opposite direction, back to an angle of less than 90 degrees relative to vertical.

2. The method of claim 1 wherein at least a portion of the manipulating time period overlaps with at least a portion of the conveying time period.

3. The method of claim 1 wherein at least a portion of the manipulating time period, at least a portion of the transmitting time period, and at least a portion of the conveying time period overlap.

4. The method of claim 1 wherein the transmitting comprises non-ionizing electromagnetic radiation selected from the group consisting of microwave radiation and radio frequency radiation.

5. The method of claim 1 wherein the non-ionizing electromagnetic radiation has a frequency selected from the group consisting of 3 KHz<f<1 MHz, 1 MHz≤f<300 MHz, and 300 MHz and 300 GHz.

6. The method of claim 1, wherein the transmitting time period occurs in less than about three minutes.

7. The method of claim 1, wherein the conveying time period, the transmitting time period, and the manipulating time period take place over a collective time period, the collective time period being less than about three minutes.

8. The method of claim 1, wherein the manipulating comprises manipulating the closed container to allow free-flowing product to contact the interior surfaces of the closed container.

9. The method of claim 1, wherein the closed container further comprises a gas bubble.

10. The method of claim 1, wherein the free-flowing product comprises a beverage.

11. The method of claim 1, wherein the first inversion occurs over a time period of at least three seconds.

12. The method of claim 11, wherein the first inversion inverts the closed container until the base of the closed container is located at an angle of up to 135 degrees relative to vertical.

13. The method of claim 12, wherein the free-flowing product comprises at least one aqueous liquid.

14. The method of claim 11, wherein the second inversion comprises inversion of the closed container back to an angle of about 60 degrees relative to vertical.

15. The method of claim 14, wherein the second inversion occurs over a time period of about two seconds.

16. The method of claim 15, wherein the inversion sequence further comprises a third inversion of the closed container between an angle of about 60 degrees from vertical and an angle of about 135 degrees from vertical, and wherein the third inversion occurs over a time period of about two seconds.

17. The method of claim 11, wherein the inversion sequence comprises at least eight inversions and occurs over an inversion time period of at least thirty seconds.

18. The method of claim 11, further comprising subjecting the closed container to the inversion sequence at least two times.

19. The method of claim 11, wherein the first inversion comprises holding the closed container at an angle of about 135 degrees relative to vertical for at least about three seconds.

20. An apparatus for sterilizing containers comprising:
   a conveyor configured to convey a plurality of closed containers for a conveying time period, the plurality of containers comprising free-flowing product disposed within the closed containers,
   a non-ionizing electromagnetic radiation device configured to transmit non-ionizing electromagnetic radiation to the free-flowing product to achieve a sterilization temperature during a transmitting time period,
   the conveyor configured to convey the plurality of closed containers through the non-ionizing electromagnetic radiation device during a conveying time period, at least a portion of the conveying time period overlapping with at least a portion of the transmitting time period,
   at least a portion of the conveyor configured to manipulate the plurality of closed containers during a manipulating time period to achieve sterilization of the entirety of the product within each of the plurality of the closed containers and the entirety of interior surfaces of each of the plurality of the closed containers, at least a portion of the manipulating time period overlapping with at least a portion of the transmitting time period, wherein each of the plurality of closed containers comprises a respective base, the conveyor configured to manipulate each of the plurality of closed containers to one or more inversion sequences comprising a first inversion of each of the plurality of the closed containers until the respective base of the closed container is located at an angle of up to 180 degrees relative to vertical, and a second inversion of the closed container, in the opposite direction, back to an angle of less than 90 degrees relative to vertical.

21. The apparatus of claim 20 wherein at least a portion of the manipulating time period overlaps with at least a portion of the conveying time period.

22. The apparatus of claim 20 wherein at least a portion of the manipulating time period, at least a portion of the transmitting time period, and at least a portion of the conveying time period overlap.

23. The apparatus of claim 20 wherein non-ionizing electromagnetic radiation device is configured to transmit non-ionizing electromagnetic radiation to the free-flowing product selected from the group consisting of microwave radiation and radio frequency radiation.

24. The apparatus of claim 20 wherein the non-ionizing electromagnetic radiation has a frequency selected from the group consisting of 3 KHz<f<1 MHz, 1 MHz≤f<300 MHz, and 300 MHz and 300 GHz.

25. The apparatus of claim 20, wherein the transmitting time period occurs in less than about three minutes.

26. The apparatus of claim 20, wherein the conveying time period, the transmitting time period, and the manipulating time period take place over a collective time period, the collective time period being less than about three minutes.

27. The apparatus of claim 20, wherein the conveyor is configured to manipulate the plurality of closed containers to allow free-flowing product to contact the interior surfaces of the plurality of closed containers.

28. The apparatus of claim 20, wherein the first inversion occurs over a time period of at least three seconds.

29. The apparatus of claim 28, wherein the one or more inversion sequences each comprise inverting each of the plurality of closed containers until the respective base of the closed container is located between an angle of about 60 degrees relative to vertical and an angle of about 135 degrees relative to vertical, and wherein the one or more inversion sequences each occur over a time period of at least 30 seconds.

30. The apparatus of claim 29, wherein the one or more inversion sequences each comprise holding the plurality of closed containers at one or more angles for at least half of a second each.

31. The apparatus of claim 20 wherein the conveyor is configured to convey bottles comprising a volume selected from the group consisting of 240 mL, 355 mL, 420 mL, and 1000 mL.

32. The apparatus of claim 20 wherein each of the plurality of closed containers comprises a gas bubble.

33. A method for sterilization of the interior of a container comprising:
    placing a container vertically upright on a base of the container, the container comprising a free-flowing product;
    subjecting the container to non-ionizing electromagnetic radiation sufficient to achieve a target sterilization temperature within about 30 seconds, and subjecting the container after it has been closed to an inversion sequence, the inversion sequence comprising a first inversion of the container until the base is located at an angle of up to 180 degrees relative to vertical, and a second inversion of the container, in the opposite direction, back to an angle of less than 90 degrees relative to vertical, wherein the first inversion occurs over a time period of at least three seconds, and wherein the inversion sequence allows for sterilizing of interior surfaces of the container.

34. The method of claim 33, wherein the first inversion of the container comprises inversion of the container until the base is located at an angle of up to 140 degrees relative to vertical, and the container is held at the angle of up to 140 degrees relative to vertical for at least three seconds.

35. The method of claim 33, wherein the inversion sequence comprises inverting the container between an angle of about 60 degrees relative to vertical and an angle of about 135 degrees from vertical, and wherein the inversion sequence occurs over a time period of at least 30 seconds.

36. The method of claim 33, wherein the container, after it has been closed, further comprises a gas bubble.

* * * * *